(12) United States Patent
Mueller et al.

(10) Patent No.: US 10,928,790 B2
(45) Date of Patent: *Feb. 23, 2021

(54) CONTROL SYSTEM WITH COORDINATED EQUIPMENT STAGING

(71) Applicant: Johnson Controls Technology Company, Auburn Hills, MI (US)

(72) Inventors: Jon T. Mueller, Milwaukee, WI (US); Joseph P. Carmody, Saukville, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 41 days.

This patent is subject to a terminal disclaimer.

(21) Appl. No.: 16/182,362

(22) Filed: Nov. 6, 2018

(65) Prior Publication Data

US 2019/0072919 A1   Mar. 7, 2019

Related U.S. Application Data

(63) Continuation of application No. 14/872,074, filed on Sep. 30, 2015, now Pat. No. 10,190,789.

(51) Int. Cl.
*G05B 15/02* (2006.01)
*F24F 11/62* (2018.01)
*F24F 11/30* (2018.01)
*F24F 140/50* (2018.01)
*F24F 11/61* (2018.01)

(52) U.S. Cl.
CPC .............. *G05B 15/02* (2013.01); *F24F 11/30* (2018.01); *F24F 11/62* (2018.01); *F24F 11/61* (2018.01); *F24F 2140/50* (2018.01); *G05B 2219/2642* (2013.01)

(58) Field of Classification Search
CPC .. F24F 11/30; F24F 11/61; F24F 11/62; F24F 2140/50; G05B 15/02; G05B 2219/2642
USPC ........................................................ 700/276
See application file for complete search history.

(56) References Cited

U.S. PATENT DOCUMENTS

| 4,349,869 A | 9/1982 | Prett et al. |
| 4,616,308 A | 10/1986 | Morshedi et al. |
| 5,301,101 A | 4/1994 | MacArthur et al. |

(Continued)

OTHER PUBLICATIONS

Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.

(Continued)

*Primary Examiner* — Chun Cao
(74) *Attorney, Agent, or Firm* — Foley & Lardner LLP

(57) ABSTRACT

A controller for multiple groups of equipment detects a staging event for a first group of equipment and determines when the staging event occurs. The controller determines whether a predetermined time period has elapsed since the staging event for the first group of equipment has occurred and prevents a second group of equipment from staging in response to a determination that the predetermined time period has not elapsed since the staging event for the first group of equipment has occurred. Preventing the second group of equipment from staging reduces peak energy consumption during the predetermined time period and reduces a demand charge based on the peak energy consumption.

20 Claims, 11 Drawing Sheets

(56) References Cited

U.S. PATENT DOCUMENTS

| | | |
|---|---|---|
| 5,347,446 A | 9/1994 | Iino et al. |
| 5,351,184 A | 9/1994 | Lu et al. |
| 5,408,406 A | 4/1995 | Mathur et al. |
| 5,442,544 A | 8/1995 | Jelinek |
| 5,519,605 A | 5/1996 | Cawlfield |
| 5,572,420 A | 11/1996 | Lu |
| 6,055,483 A | 4/2000 | Lu |
| 6,122,555 A | 9/2000 | Lu |
| 6,278,899 B1 | 8/2001 | Piche et al. |
| 6,347,254 B1 | 2/2002 | Lu |
| 6,459,939 B1 | 10/2002 | Hugo |
| 6,807,510 B1 | 10/2004 | Backstrom et al. |
| 7,050,863 B2 | 5/2006 | Mehta et al. |
| 7,050,866 B2 | 5/2006 | Martin et al. |
| 7,113,890 B2 | 9/2006 | Frerichs et al. |
| 7,152,023 B2 | 12/2006 | Das |
| 7,165,399 B2 | 1/2007 | Stewart |
| 7,188,779 B2 | 3/2007 | Alles |
| 7,197,485 B2 | 3/2007 | Fuller |
| 7,203,554 B2 | 4/2007 | Fuller |
| 7,266,416 B2 | 9/2007 | Gallestey et al. |
| 7,272,454 B2 | 9/2007 | Wojsznis et al. |
| 7,275,374 B2 | 10/2007 | Stewart et al. |
| 7,328,074 B2 | 2/2008 | Das et al. |
| 7,328,577 B2 | 2/2008 | Stewart et al. |
| 7,376,471 B2 | 5/2008 | Das et al. |
| 7,376,472 B2 | 5/2008 | Wojsznis et al. |
| 7,389,773 B2 | 6/2008 | Stewart et al. |
| 7,400,933 B2 | 7/2008 | Rawlings et al. |
| 7,418,372 B2 | 8/2008 | Nishira et al. |
| 7,454,253 B2 | 11/2008 | Fan |
| 7,496,413 B2 | 2/2009 | Fan et al. |
| 7,577,483 B2 | 8/2009 | Fan et al. |
| 7,580,775 B2 | 8/2009 | Kulyk et al. |
| 7,591,135 B2 | 9/2009 | Stewart |
| 7,610,108 B2 | 10/2009 | Boe et al. |
| 7,650,195 B2 | 1/2010 | Fan et al. |
| 7,664,573 B2 | 2/2010 | Ahmed |
| 7,676,283 B2 | 3/2010 | Liepold et al. |
| 7,809,472 B1 | 10/2010 | Silva et al. |
| 7,826,909 B2 | 11/2010 | Attarwala |
| 7,827,813 B2 | 11/2010 | Seem |
| 7,844,352 B2 | 11/2010 | Vouzis et al. |
| 7,856,281 B2 | 12/2010 | Thiele et al. |
| 7,878,178 B2 | 2/2011 | Stewart et al. |
| 7,894,943 B2 | 2/2011 | Sloup et al. |
| 7,894,946 B2 | 2/2011 | Kulyk et al. |
| 7,930,045 B2 | 4/2011 | Cheng |
| 7,945,352 B2 | 5/2011 | Koc |
| 7,949,416 B2 | 5/2011 | Fuller |
| 7,987,145 B2 | 7/2011 | Baramov |
| 7,996,140 B2 | 8/2011 | Stewart et al. |
| 8,005,575 B2 | 8/2011 | Kirchhof |
| 8,032,235 B2 | 10/2011 | Sayyar-Rodsari |
| 8,036,758 B2 | 10/2011 | Lu et al. |
| 8,046,089 B2 | 10/2011 | Renfro et al. |
| 8,060,258 B2 | 11/2011 | Butoyi |
| 8,060,290 B2 | 11/2011 | Stewart et al. |
| 8,073,659 B2 | 12/2011 | Gugaliya et al. |
| 8,078,291 B2 | 12/2011 | Pekar et al. |
| 8,096,140 B2 | 1/2012 | Seem |
| 8,105,029 B2 | 1/2012 | Egedal et al. |
| 8,109,255 B2 | 2/2012 | Stewart et al. |
| 8,121,818 B2 | 2/2012 | Gorinevsky |
| 8,126,575 B2 | 2/2012 | Attarwala |
| 8,145,329 B2 | 3/2012 | Pekar et al. |
| 8,180,493 B1 | 5/2012 | Laskow |
| 8,185,217 B2 | 5/2012 | Thiele |
| 8,200,346 B2 | 6/2012 | Thiele |
| 8,495,888 B2 | 7/2013 | Seem |
| 8,527,108 B2 | 9/2013 | Kulyk et al. |
| 8,527,109 B2 | 9/2013 | Kulyk et al. |
| 8,600,561 B1 | 12/2013 | Modi et al. |
| 8,843,238 B2 | 9/2014 | Wenzel et al. |
| 8,903,554 B2 | 12/2014 | Stagner |
| 8,918,223 B2 | 12/2014 | Kulyk et al. |
| 9,002,532 B2 | 4/2015 | Asmus |
| 9,110,647 B2 | 8/2015 | Kulyk et al. |
| 9,175,867 B2 | 11/2015 | Grohman |
| 9,235,657 B1 | 1/2016 | Wenzel et al. |
| 9,429,923 B2 | 8/2016 | Ward et al. |
| 9,436,179 B1 | 9/2016 | Turney et al. |
| 9,703,339 B2 | 7/2017 | Kulyk et al. |
| 9,852,481 B1 | 12/2017 | Turney et al. |
| 10,139,877 B2 | 11/2018 | Kulyk et al. |
| 10,190,789 B2 * | 1/2019 | Mueller ............... G05B 15/02 |
| 2008/0251590 A1 | 10/2008 | Arneson |
| 2010/0087933 A1 | 4/2010 | Cheng |
| 2010/0235004 A1 | 9/2010 | Thind |
| 2010/0269854 A1 | 10/2010 | Barbieri et al. |
| 2010/0298988 A1 * | 11/2010 | Stachler ............... G01R 21/127 |
| | | 700/276 |
| 2011/0022193 A1 | 1/2011 | Panaitescu |
| 2011/0060424 A1 | 3/2011 | Havlena |
| 2011/0088000 A1 | 4/2011 | MacKay |
| 2011/0125293 A1 | 5/2011 | Havlena |
| 2011/0257789 A1 | 10/2011 | Stewart et al. |
| 2011/0301723 A1 | 12/2011 | Pekar et al. |
| 2012/0059351 A1 | 3/2012 | Nordh |
| 2012/0060505 A1 | 3/2012 | Fuller et al. |
| 2012/0083939 A1 * | 4/2012 | Rognli ............... H02J 3/14 |
| | | 700/297 |
| 2012/0109620 A1 | 5/2012 | Gaikwad et al. |
| 2012/0116546 A1 | 5/2012 | Sayyar-Rodsari |
| 2015/0142181 A1 | 5/2015 | Stachler et al. |

OTHER PUBLICATIONS

Diederik Kingma and Jimmy Ba. Adam: A Method for Stochastic Optimization. In International Conference on Learning Representations (ICLR), 2015, 15 pages.

George EP Box, Gwilym M Jenkins, Gregory C Reinsel, and Greta M Ljung. Time Series Analysis: Forecasting and Control. John Wiley & Sons, 2015, chapters 13-15. 82 pages.

Jie Chen and Guoxiang Gu. Control-oriented System Identification: an H1 Approach, vol. 19. Wiley-Interscience, 2000, chapters 3 & 8, 38 pages.

Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.

K. J. Astrom. Optimal Control of Markov Decision Processes with Incomplete State Estimation. J. Math. Anal. Appl., 10:174-205, 1965.31 pages.

Kelman and F. Borrelli. Bilinear Model Predictive Control of a HVAC System Using Sequential Quadratic Programming. In Proceedings of the 2011 IFAC World Congress, 2011, 6 pages.

Lennart Ljung and Torsten Soderstrom. Theory and practice of recursive identification, vol. 5. JSTOR, 1983, chapters 2, 3 & 7, 80 pages.

Lennart Ljung, editor. System identification: Theory for the User (2nd Edition). Prentice Hall, Upper Saddle River, New Jersey, 1999, chapters 5 and 7, 40 pages.

Moritz Hardt, Tengyu Ma, and Benjamin Recht. Gradient Descent Learns Linear Dynamical Systems. arXiv preprint arXiv:1609.05191, 2016, 44 pages.

Nevena et al. Data center cooling using model-predictive control, 10 pages.

Sergio Bittanti, Marco C Campi, et al. Adaptive Control of Linear Time Invariant Systems: The "Bet on the Best" Principle. Communications in Information & Systems, 6(4):299-320, 2006. 21 pages.

Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.

Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.

(56) References Cited

OTHER PUBLICATIONS

First Chinese Office Action for Application No. CN 201610866062.X dated Dec. 5, 2019, 8 pages.

* cited by examiner

CONTROL SYSTEM WITH COORDINATED EQUIPMENT STAGING

CROSS-REFERENCE TO RELATED PATENT APPLICATION

This application is a continuation of U.S. patent application Ser. No. 14/872,074 filed Sep. 30, 2015, the entire disclosure of which is incorporated by reference herein.

BACKGROUND

The present disclosure relates generally to a central plant that includes multiple subplants configured to serve the heating loads and/or cooling loads of a building. The present invention relates more particularly to systems and methods for coordinating HVAC equipment staging across multiple subplants of a central plant.

A central plant typically includes various types of HVAC equipment configured to serve the thermal energy loads of a building or campus. For example, a central plant may include heaters, chillers, heat recovery chillers (HRCs), cooling towers, or other types of HVAC equipment. The central plant may consume resources from a utility (e.g., electricity, water, natural gas, etc.) to heat or cool a working fluid that is circulated to one or more buildings or stored for later use (e.g., in thermal energy storage tanks) to provide heating or cooling for the building.

Some central plants include multiple subplants (e.g., a heater subplant, a HRC subplant, a chiller subplant, etc.), each of which is configured to serve a particular type of load (e.g., heating, cooling, hot water, cold water, etc.). For example, a cooling load can be met by activating the chillers in the chiller subplant and/or the HRCs in the HRC subplant. Equipment staging within a subplant (e.g., activating or deactivating HVAC devices) is typically controlled by a subplant level controller configured to manage the equipment within the subplant. The subplant level controllers often operate independently and do not consider the state of any other subplant when determining whether to stage their equipment.

Some types of HVAC equipment consume more energy when they are initially started or activated than they do under steady-state operation. For example, chillers and HRCs may cause a temporary spike in energy consumption when they are initially started or activated. In some instances, an increase in cooling load may cause the load setpoints for the HRC subplant and the chiller subplant to increase simultaneously. However, if the chillers and the HRCs are staged at the same time, the resultant spikes in energy consumption can stack on top of each other, causing a high peak energy consumption.

A demand charge is a cost imposed by a utility provider based on the maximum usage of a particular resource (e.g., maximum energy consumption) during a demand charge period. A high peak energy consumption may be undesirable since it increases the maximum rate of energy consumption used by the utility provider to calculate the demand charge. However, it can be difficult and challenging to avoid spikes in energy consumption while ensuring that the heating and cooling loads are met in an energy efficient manner.

SUMMARY

One implementation of the present disclosure is a controller for equipment that includes at least a first group of equipment and a second group of equipment that contribute to a peak energy consumption of a building. The controller includes a communications interface configured to communicate with the first group of equipment and the second group of equipment and a processing circuit communicably coupled to the communications interface. The processing circuit includes processor and memory. The memory includes an equipment staging detector configured to detect a staging event for the first group of equipment and to determine when the staging event occurs, a staging evaluator configured to use input from the equipment staging detector to determine whether a predetermined time period has elapsed since the staging event for the first group of equipment has occurred, and a staging preventer configured to prevent the second group of equipment from staging in response to a determination that the predetermined time period has not elapsed since the staging event for the first group of equipment has occurred. Preventing the second group of equipment from staging reduces the peak energy consumption of the building during the predetermined time period and reduces a demand charge based on the peak energy consumption.

In some embodiments, the first group of equipment include equipment of a first subplant of a central plant configured to serve a thermal energy load, the second group of equipment include equipment of a second subplant of the central plant, and the first subplant and the second subplant include at least two of a heater subplant, a heat recovery chiller subplant, a chiller subplant, a cooling tower subplant, a hot thermal energy storage subplant, and a cold thermal energy storage subplant.

In some embodiments, the first group of equipment and the second group of equipment include at least one of boilers, heaters, pumps, chillers, heat recovery chillers, cooling towers, and thermal energy storage tanks.

In some embodiments, the staging event includes at least one of activating or deactivating one or more devices of the first group of equipment, changing a load setpoint for the first group of equipment, and changing a capacity of first group of equipment.

In some embodiments, the controller includes an optimizer configured to perform an optimization process to determine a desired set of equipment of the second group of equipment to operate within the predetermined time period.

In some embodiments, the controller includes a desired equipment drop detector configured to determine whether the desired set of equipment of the second group of equipment has dropped to zero. The staging preventer can be configured to allow the second group of equipment to stage in response to a determination that the desired set of equipment of the second group of equipment has dropped to zero.

In some embodiments, the controller includes a toggle input configured to provide opposite binary inputs for the first group of equipment and the second group of equipment. The staging preventer can be configured to allow the second group of equipment to stage in response to a determination that the binary input for the second group of equipment has a first binary value. The staging preventer can be configured to prevent the second group of equipment from staging in response to a determination that the binary input for the second group of equipment has a second binary value, opposite the first binary value.

In some embodiments, the toggle input is configured to periodically swap the opposite binary inputs for the first group of equipment and the second group of equipment.

In some embodiments, the staging preventer is configured to use the toggle input as an override signal and determine whether to prevent the second group of equipment from staging based on the toggle input regardless of whether the predetermined time period has elapsed since the staging event for the first group of equipment has occurred.

In some embodiments, the staging evaluator is configured to determine whether the first group of equipment is at steady state and whether the second group of equipment is at steady state. The staging preventer can be configured to prevent the second group of equipment from staging in response to a determination that the second group of equipment is at steady state and the first group of equipment is not at steady state.

Another implementation of the present disclosure is a method for coordinating equipment staging across at least a first group of equipment and a second group of equipment that contribute to a peak energy consumption of a building. The method includes detecting a staging event for the first group of equipment and a time at which the staging event occurs, determining whether a predetermined time period has elapsed since the staging event for the first group of equipment has occurred, and preventing the second group of equipment from staging in response to a determination that the predetermined time period has not elapsed since the staging event for the first group of equipment has occurred. Preventing the second group of equipment from staging reduces the peak energy consumption of the building during the predetermined time period and reduces a demand charge based on the peak energy consumption.

In some embodiments, the first group of equipment include equipment of a first subplant of a central plant configured to serve a thermal energy load, the second group of equipment include equipment of a second subplant of the central plant, and the first subplant and the second subplant include at least two of a heater subplant, a heat recovery chiller subplant, a chiller subplant, a cooling tower subplant, a hot thermal energy storage subplant, and a cold thermal energy storage subplant.

In some embodiments, the first group of equipment and the second group of equipment include at least one of boilers, heaters, pumps, chillers, heat recovery chillers, cooling towers, and thermal energy storage tanks.

In some embodiments, the staging event includes at least one of activating or deactivating one or more devices of the first group of equipment, changing a load setpoint for the first group of equipment, and changing a capacity of first group of equipment.

In some embodiments, the method includes performing an optimization process to determine a desired set of equipment of the second group of equipment to operate within the predetermined time period.

In some embodiments, the method includes determining whether the desired set of equipment of the second group of equipment has dropped to zero and allowing the second group of equipment to stage in response to a determination that the desired set of equipment of the second group of equipment has dropped to zero.

In some embodiments, the method includes providing opposite binary inputs for the first group of equipment and the second group of equipment, allowing the second group of equipment to stage in response to a determination that the binary input for the second group of equipment has a first binary value, and preventing the second group of equipment from staging in response to a determination that the binary input for the second group of equipment has a second binary value, opposite the first binary value.

In some embodiments, the method includes periodically swapping the opposite binary inputs for the first group of equipment and the second group of equipment.

In some embodiments, the toggle input is used as an override signal to prevent the second group of equipment from staging regardless of whether the predetermined time period has elapsed since the staging event for the first group of equipment has occurred.

In some embodiments, the method includes determining whether the first group of equipment is at steady state and whether the second group of equipment is at steady state and preventing the second group of equipment from staging in response to a determination that the second group of equipment is at steady state and the first group of equipment is not at steady state.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, a central plant with coordinated HVAC equipment staging across multiple subplants is shown, according to an exemplary embodiment. The central plant may include various types of HVAC equipment configured to serve the thermal energy loads of a building or campus. For example, the central plant may include heaters, chillers, heat recovery chillers (HRCs), cooling towers, or other types of HVAC equipment. The central plant may consume resources from a utility (e.g., electricity, water, natural gas, etc.) to heat or cool a working fluid that is circulated to one or more buildings or stored for later use (e.g., in thermal energy storage tanks) to provide heating or cooling for the building. The central plant may include multiple subplants (e.g., a heater subplant, a HRC subplant, a chiller subplant, etc.), each of which is configured to serve a particular type of load (e.g., heating, cooling, hot water, cold water, etc.).

The central plant may include an equipment staging coordinator configured to coordinate the staging (e.g., turning on/off, activating/deactivating, etc.) of HVAC equipment across multiple subplants. The equipment staging coordinator may prevent each of the subplants from reacting to a change in building load too quickly (e.g., within a predetermined time period) after a change in another subplant has occurred. Advantageously, the equipment staging coordinator may reduce the peak energy consumption of the central plant by preventing multiple subplants from staging their equipment at the same time and/or within the same time period.

In some embodiments, the equipment staging coordinator prevents two or more of the subplants from staging their equipment simultaneously. In some embodiments, the equipment staging coordinator prevents a first subplant from staging equipment of the first subplant within a predetermined time period after a second subplant has staged equipment of the second subplant. By preventing multiple subplants from staging their equipment at the same time or within the same time period, the equipment staging coordinator ensures that any temporary spikes in energy consumption do not stack on top of each other, thereby reducing the maximum energy consumption used to calculate the demand charge. These and other features and advantages of the equipment staging coordinator are discussed in greater detail below.

Building with HVAC System

Figure 1:
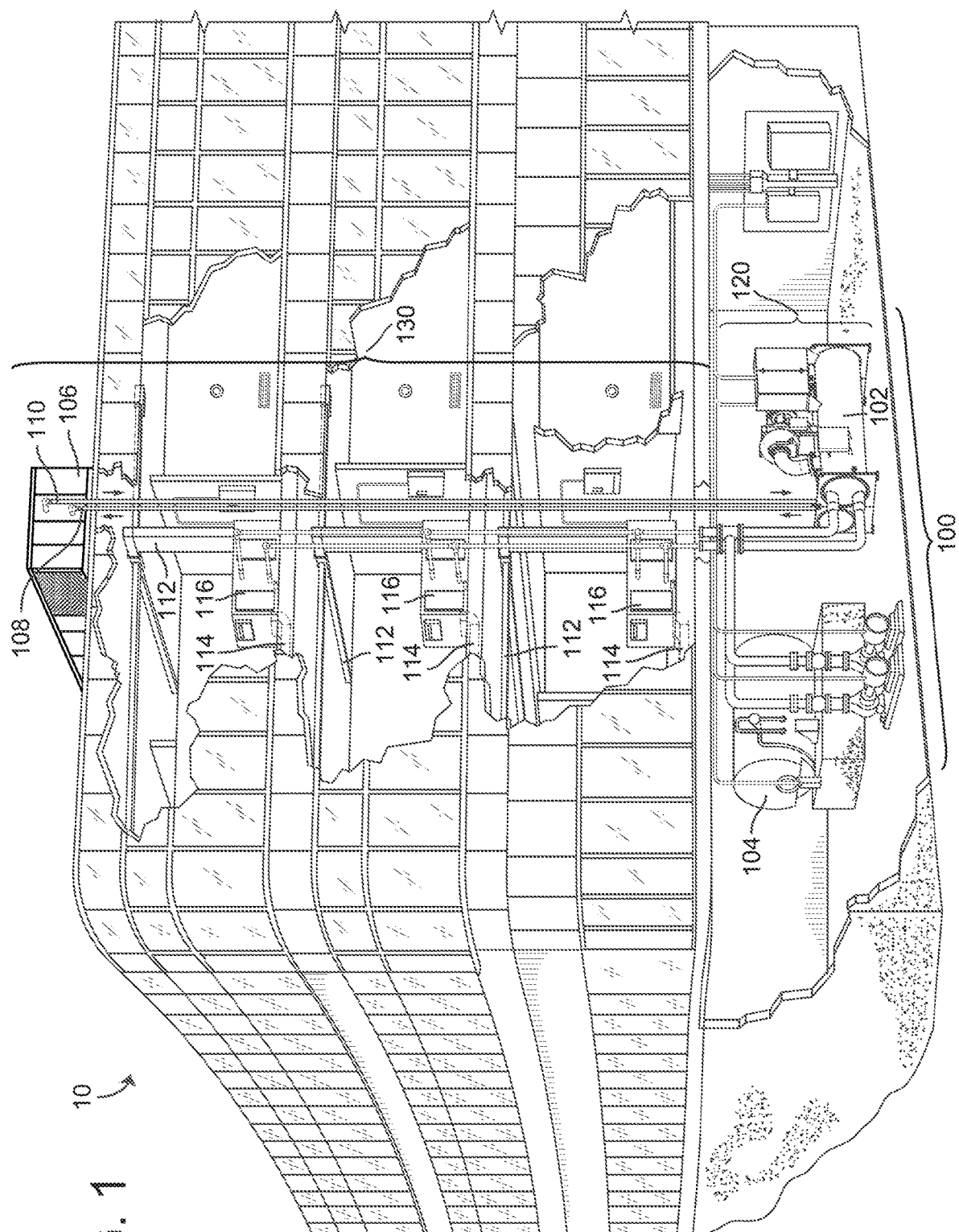
FIG. 1 is a drawing of a building equipped with a HVAC system, according to an exemplary embodiment.

Referring now to FIG. 1, a perspective view of a building 10 is shown. Building 10 is served by a building automation system (BAS). A BAS is, in general, a system of devices configured to control, monitor, and manage equipment in or around a building or building area. A BAS can include, for example, a HVAC system, a security system, a lighting system, a fire alerting system, any other system that is capable of managing building functions or devices, or any combination thereof.

The BAS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 is replaced with a central energy plant such as central plant 200, described with reference to FIG. 2.

Still referring to FIG. 1, HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via air supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Central Plant and Control System

Figure 2:
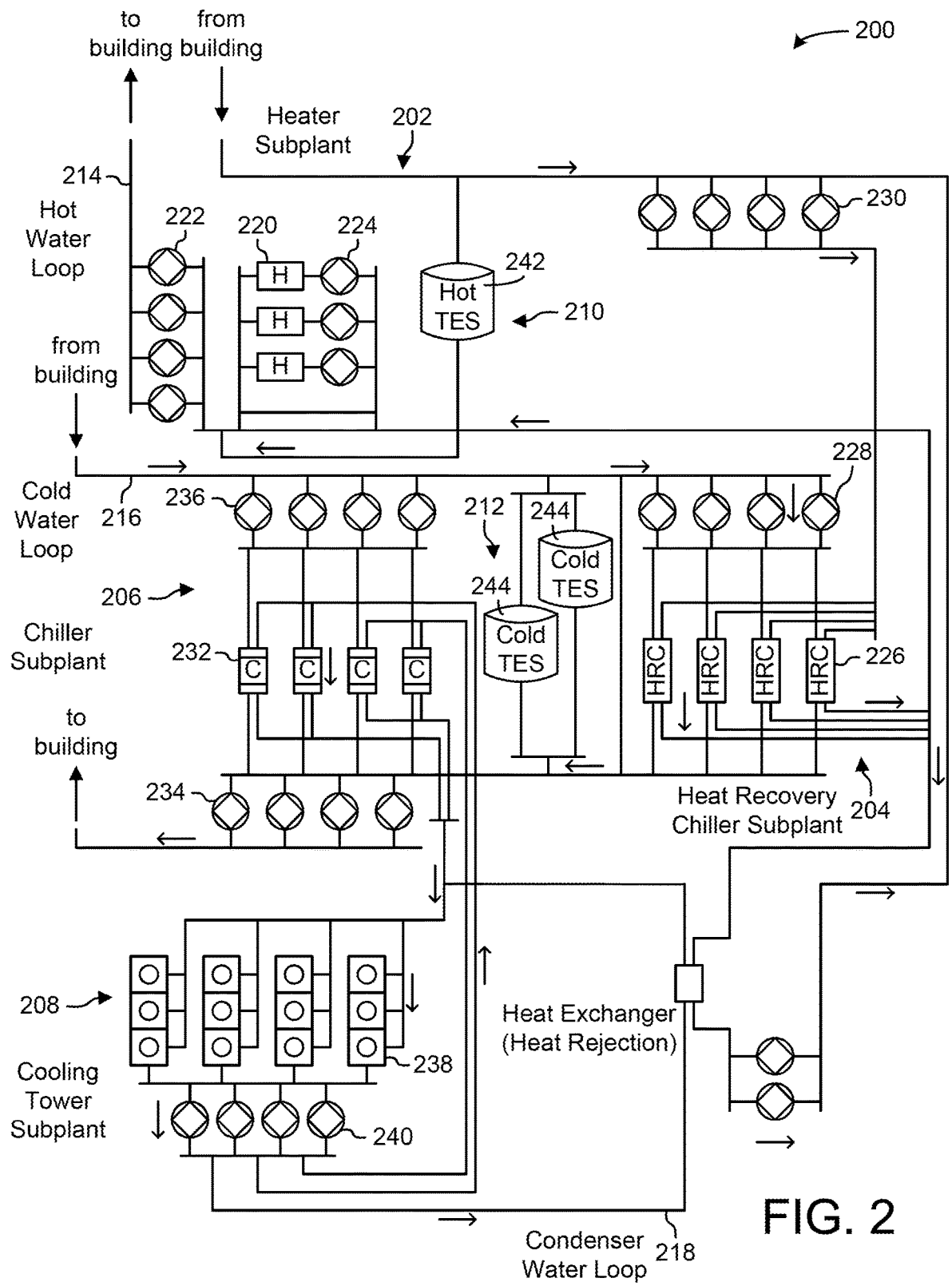
FIG. 2 is a schematic of a central plant that includes a plurality of subplants which may be used to provide heating and/or cooling to the building of FIG. 1, according to an exemplary embodiment.

Referring now to FIG. 2, a block diagram of a central plant 200 is shown, according to an exemplary embodiment. In brief overview, central plant 200 may include various types of equipment configured to serve the thermal energy loads of a building or campus (i.e., a system of buildings). For example, central plant 200 may include heaters, chillers, heat recovery chillers, cooling towers, or other types of equipment configured to serve the heating and/or cooling loads of a building or campus. Central plant 200 may consume resources from a utility (e.g., electricity, water, natural gas, etc.) to heat or cool a working fluid that is circulated to one or more buildings or stored for later use (e.g., in thermal energy storage tanks) to provide heating or cooling for the buildings. In various embodiments, central plant 200 may supplement or replace waterside system 120 in building 10 or may be implemented separate from building 10 (e.g., at an offsite location).

Central plant 200 is shown to include a plurality of subplants 202-212 including a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to central plant 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in central plant 200 (e.g., pumps 222, 224, 228, 230, 234, 236, and/or 240) or pipelines in central plant 200 include an isolation valve associated therewith. Isolation valves may be integrated with the pumps or positioned upstream or downstream of the pumps to control the fluid flows in central plant 200. In various embodiments, central plant 200 may include more, fewer, or different types of devices and/or subplants based on the particular configuration of central plant 200 and the types of loads served by central plant 200.

Figure 3:
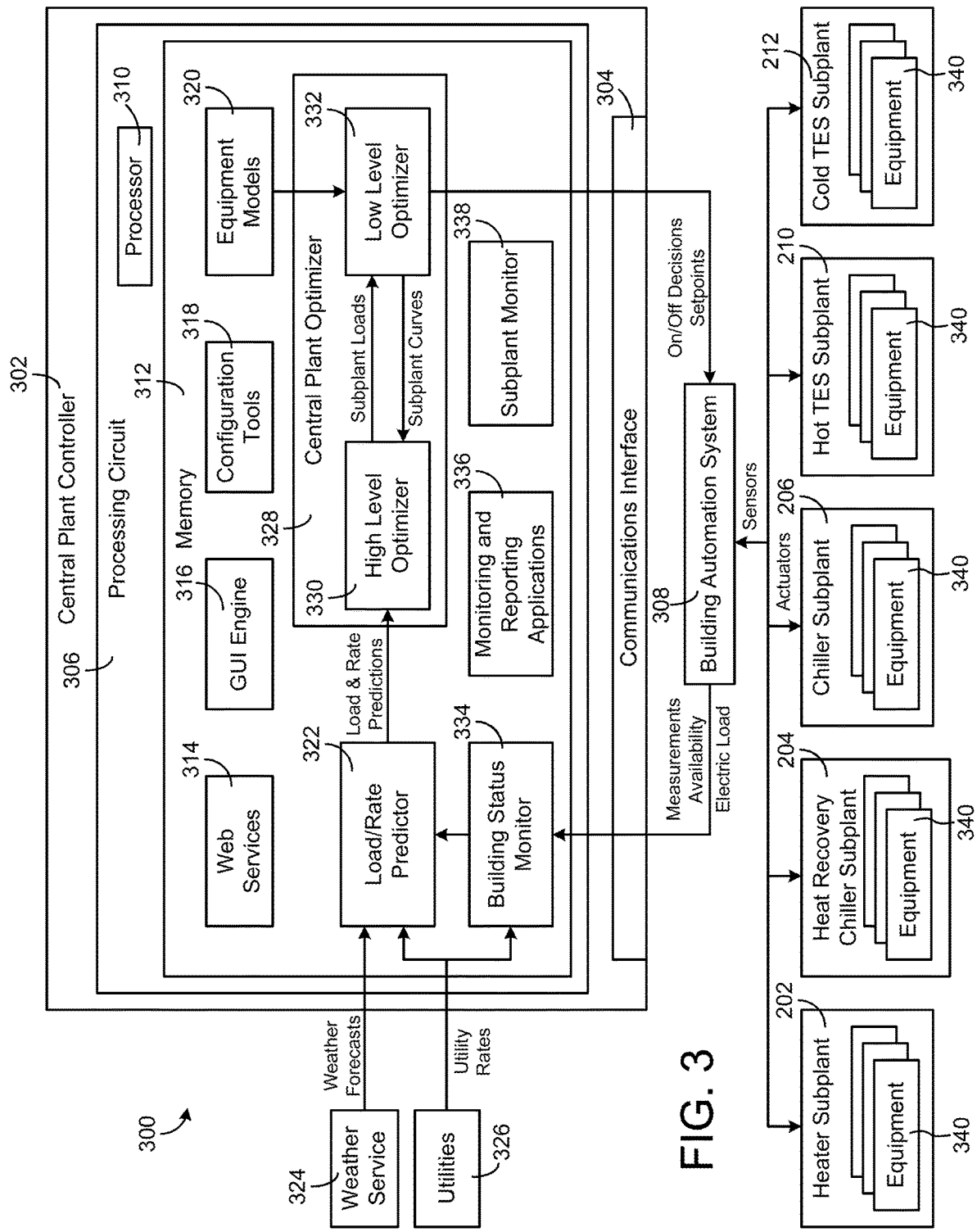
FIG. 3 is a block diagram of a central plant system including a central plant controller configured to manage the plurality of subplants of FIG. 2, according to an exemplary embodiment.

Referring now to FIG. 3, a block diagram illustrating a central plant system 300 is shown, according to an exemplary embodiment. System 300 is shown to include a central plant controller 302, a building automation system (BAS) 308, and a plurality of subplants 202-212. Subplants 202-212 may be the same as previously described with reference to FIG. 2. For example, subplants 202-212 are shown to include a heater subplant 202, a heat recovery chiller subplant 204, a chiller subplant 206, a hot TES subplant 210, and a cold TES subplant 212.

Each of subplants 202-212 is shown to include equipment 340 that can be controlled by central plant controller 302 and/or building automation system 308 to optimize the performance of central plant 200. Equipment 340 may include, for example, heating devices 220, chillers 232, heat recovery heat exchangers 226, cooling towers 238, thermal energy storage devices 242-244, pumps, valves, and/or other devices of subplants 202-212. Individual devices of equipment 340 can be turned on or off to adjust the thermal energy load served by each of subplants 202-212. In some embodiments, individual devices of equipment 340 can be operated at variable capacities (e.g., operating a chiller at 10% capacity or 60% capacity) according to an operating setpoint received from central plant controller 302.

In some embodiments, one or more of subplants 202-212 includes a subplant level controller configured to control the equipment 340 of the corresponding subplant. For example, central plant controller 302 may determine an on/off configuration and global operating setpoints for equipment 340. In response to the on/off configuration and received global operating setpoints, the subplant controllers may turn individual devices of equipment 340 on or off, and implement specific operating setpoints (e.g., damper position, vane position, fan speed, pump speed, etc.) to reach or maintain the global operating setpoints.

In some embodiments, the subplant level controllers receive subplant load setpoints from central plant controller 302. Each subplant level controller may use the subplant load setpoint for the corresponding subplant to select one or more devices of the equipment 340 within the subplant to activate or deactivate in order to meet the subplant load setpoint in an energy-efficient manner. In other embodiments, the equipment selection and staging decisions (i.e., deciding which devices to turn on/off) are performed by a low level optimizer 332 within central plant controller 302.

BAS 308 may be configured to monitor conditions within a controlled building or building zone. For example, BAS 308 may receive input from various sensors (e.g., temperature sensors, humidity sensors, airflow sensors, voltage sensors, etc.) distributed throughout the building and may report building conditions to central plant controller 302. Building conditions may include, for example, a temperature of the building or a zone of the building, a power consumption (e.g., electric load) of the building, a state of one or more actuators configured to affect a controlled state within the building, or other types of information relating to the controlled building. BAS 308 may operate subplants 202-212 to affect the monitored conditions within the building and/or to serve the thermal energy loads of the building.

BAS 308 may receive control signals from central plant controller 302 specifying on/off states and/or setpoints for equipment 340. BAS 308 may control equipment 340 (e.g., via actuators, power relays, etc.) in accordance with the control signals provided by central plant controller 302. For example, BAS 308 may operate equipment 340 using closed loop control to achieve the setpoints specified by central plant controller 302. In various embodiments, BAS 308 may be combined with central plant controller 302 or may be part of a separate building automation system. According to an exemplary embodiment, BAS 308 is a METASYS® brand building automation system, as sold by Johnson Controls, Inc.

Central plant controller 302 may monitor the status of the controlled building using information received from BAS 308. Central plant controller 302 may be configured to predict the thermal energy loads (e.g., heating loads, cooling loads, etc.) of the building for plurality of time steps in a prediction window (e.g., using weather forecasts from a weather service 324). Central plant controller 302 may generate on/off decisions and/or setpoints for equipment 340 to minimize the cost of energy consumed by subplants 202-212 to serve the predicted heating and/or cooling loads for the duration of the prediction window. According to an exemplary embodiment, central plant controller 302 is integrated within a single computer (e.g., one server, one housing, etc.). In various other exemplary embodiments, central plant controller 302 can be distributed across multiple servers or computers (e.g., that can exist in distributed locations). In another exemplary embodiment, central plant controller 302 is integrated with a smart building manager that manages multiple building systems and/or combined with BAS 308.

Central plant controller 302 is shown to include a communications interface 304 and a processing circuit 306. Communications interface 304 may include wired or wireless interfaces (e.g., jacks, antennas, transmitters, receivers, transceivers, wire terminals, etc.) for conducting data communications with various systems, devices, or networks. For example, communications interface 304 may include an Ethernet card and port for sending and receiving data via an Ethernet-based communications network and/or a WiFi transceiver for communicating via a wireless communications network. Communications interface 304 may be configured to communicate via local area networks or wide area networks (e.g., the Internet, a building WAN, etc.) and may use a variety of communications protocols (e.g., BACnet, IP, LON, etc.).

Communications interface 304 may be a network interface configured to facilitate electronic data communications between central plant controller 302 and various external systems or devices (e.g., BAS 308, subplants 202-212, etc.). For example, central plant controller 302 may receive information from BAS 308 indicating one or more measured states of the controlled building (e.g., temperature, humidity, electric loads, etc.) and one or more states of subplants 202-212 (e.g., equipment status, power consumption, equipment availability, etc.). Communications interface 304 may receive inputs from BAS 308 and/or subplants 202-212 and may provide operating parameters (e.g., on/off decisions, setpoints, etc.) to subplants 202-212 via BAS 308. The operating parameters may cause subplants 202-212 to activate, deactivate, or adjust a setpoint for various devices of equipment 340.

Still referring to FIG. 3, processing circuit 306 is shown to include a processor 310 and memory 312. Processor 310 may be a general purpose or specific purpose processor, an application specific integrated circuit (ASIC), one or more field programmable gate arrays (FPGAs), a group of processing components, or other suitable processing components. Processor 310 may be configured to execute computer code or instructions stored in memory 312 or received from other computer readable media (e.g., CDROM, network storage, a remote server, etc.).

Memory 312 may include one or more devices (e.g., memory units, memory devices, storage devices, etc.) for storing data and/or computer code for completing and/or facilitating the various processes described in the present disclosure. Memory 312 may include random access memory (RAM), read-only memory (ROM), hard drive storage, temporary storage, non-volatile memory, flash memory, optical memory, or any other suitable memory for storing software objects and/or computer instructions. Memory 312 may include database components, object code components, script components, or any other type of information structure for supporting the various activities and information structures described in the present disclosure. Memory 312 may be communicably connected to processor 310 via processing circuit 306 and may include computer code for executing (e.g., by processor 310) one or more processes described herein.

Still referring to FIG. 3, memory 312 is shown to include a building status monitor 334. Central plant controller 302 may receive data regarding the overall building or building space to be heated or cooled with central plant 200 via building status monitor 334. In an exemplary embodiment, building status monitor 334 may include a graphical user interface component configured to provide graphical user interfaces to a user for selecting building requirements (e.g., overall temperature parameters, selecting schedules for the building, selecting different temperature levels for different building zones, etc.).

Central plant controller 302 may determine on/off configurations and operating setpoints to satisfy the building requirements received from building status monitor 334. In some embodiments, building status monitor 334 receives, collects, stores, and/or transmits cooling load requirements, building temperature setpoints, occupancy data, weather data, energy data, schedule data, and other building parameters. In some embodiments, building status monitor 334 stores data regarding energy costs, such as pricing information available from utilities 326 (energy charge, demand charge, etc.).

Still referring to FIG. 3, memory 312 is shown to include a load/rate predictor 322. Load/rate predictor 322 may be configured to predict the thermal energy loads ($\hat{\ell}_k$) of the building or campus for each time step k (e.g., k=1 . . . n) of an optimization period. Load/rate predictor 322 is shown receiving weather forecasts from a weather service 324. In some embodiments, load/rate predictor 322 predicts the thermal energy loads $\hat{\ell}_k$ as a function of the weather forecasts. In some embodiments, load/rate predictor 322 uses feedback from BAS 308 to predict loads $\hat{\ell}_k$. Feedback from BAS 308 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 322 receives a measured electric load and/or previous measured load data from BAS 308 (e.g., via building status monitor 334). Load/rate predictor 322 may predict loads $\hat{\ell}_k$ as a function of a given weather forecast ($\hat{\phi}_w$), a day type (day), the time of day (t), and previous measured load data ($Y_{k-1}$). Such a relationship is expressed in the following equation:

$$\hat{\ell}_k = f(\hat{\phi}_w, \text{day}, t | Y_{k-1})$$

In some embodiments, load/rate predictor 322 uses a deterministic plus stochastic model trained from historical load data to predict loads $\hat{\ell}_k$. Load/rate predictor 322 may use any of a variety of prediction methods to predict loads $\hat{\ell}_k$ (e.g., linear regression for the deterministic portion and an AR model for the stochastic portion). Load/rate predictor 322 may predict one or more different types of loads for the building or campus. For example, load/rate predictor 322 may predict a hot water load $\hat{\ell}_{Hot,k}$ and a cold water load $\hat{\ell}_{Cold,k}$ for each time step k within the prediction window.

Load/rate predictor 322 is shown receiving utility rates from utilities 326. Utility rates may indicate a cost or price per unit of a resource (e.g., electricity, natural gas, water, etc.) provided by utilities 326 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 326 or predicted utility rates estimated by load/rate predictor 322.

In some embodiments, the utility rates include demand charges for one or more resources provided by utilities 326. A demand charge may define a separate cost imposed by utilities 326 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, central plant optimizer 328 may be configured to account for demand charges in the high level optimization process performed by high level optimizer 330. Utilities 326 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period.

Load/rate predictor 322 may store the predicted loads $\hat{\ell}_k$ and the utility rates in memory 312 and/or provide the predicted loads $\hat{\ell}_k$ and the utility rates to central plant optimizer 328. Central plant optimizer 328 may use the predicted loads $\hat{\ell}_k$ and the utility rates to determine an optimal load distribution for subplants 202-212 and to generate on/off decisions and setpoints for equipment 340.

Still referring to FIG. 3, memory 312 is shown to include an central plant optimizer 328. Central plant optimizer 328 may perform a cascaded optimization process to optimize the performance of central plant 200. For example, central plant optimizer 328 is shown to include a high level optimizer 330 and a low level optimizer 332. High level optimizer 330 may control an outer (e.g., subplant level) loop of the cascaded optimization. High level optimizer 330 may determine an optimal distribution of thermal energy loads across subplants 202-212 for each time step in the prediction window in order to optimize (e.g., minimize) the cost of energy consumed by subplants 202-212. Low level optimizer 332 may control an inner (e.g., equipment level) loop of the cascaded optimization. Low level optimizer 332 may determine how to best run each subplant at the load setpoint determined by high level optimizer 330. For example, low level optimizer 332 may determine on/off states and/or operating setpoints for various devices of equipment 340 in order to optimize (e.g., minimize) the energy consumption of each subplant while meeting the thermal energy load setpoint for the subplant. The cascaded optimization process is described in greater detail with reference to FIG. 4.

Still referring to FIG. 3, memory 312 is shown to include a subplant monitor 338. Subplant monitor 338 may store historical data regarding past operating statuses, past operating setpoints, and instructions for calculating and/or implementing control parameters for subplants 202-212. Subplant monitor 338 may also receive, store, and/or transmit data regarding the conditions of individual devices of equipment 340, such as operating efficiency, equipment degradation, a date since last service, a lifespan parameter, a condition grade, or other device-specific data. Subplant monitor 338 may receive data from subplants 202-212 and/or BAS 308 via communications interface 304. Subplant monitor 338 may also receive and store on/off statuses and operating setpoints from low level optimizer 332.

Data and processing results from central plant optimizer 328, subplant monitor 338, or other modules of central plant controller 302 may be accessed by (or pushed to) monitoring and reporting applications 336. Monitoring and reporting applications 336 may be configured to generate real time system health dashboards that can be viewed and navigated by a user (e.g., a central plant engineer). For example, monitoring and reporting applications 336 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across central plants in different buildings (real or modeled), different campuses, or the like. Other GUI elements or reports may be generated and shown based on available data that allow users to assess performance across one or more central plants from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the central plant.

Still referring to FIG. 3, central plant controller 302 may include one or more GUI servers, web services 314, or GUI engines 316 to support monitoring and reporting applications 336. In various embodiments, applications 336, web services 314, and GUI engine 316 may be provided as separate components outside of central plant controller 302 (e.g., as part of a smart building manager). Central plant controller 302 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Central plant controller 302 may be configured to provide the results of any such processing to other databases, tables, XML files, or other data structures for further querying, calculation, or access by, for example, external monitoring and reporting applications.

Central plant controller 302 is shown to include configuration tools 318. Configuration tools 318 can allow a user to define (e.g., via graphical user interfaces, via prompt-driven wizards, etc.) how central plant controller 302 should react to changing conditions in the central plant subsystems. In an exemplary embodiment, configuration tools 318 allow a user to build and store condition-response scenarios that can cross multiple central plant devices, multiple building systems, and multiple enterprise control applications (e.g., work order management system applications, entity resource planning applications, etc.). For example, configuration tools 318 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 318 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Figure 4:
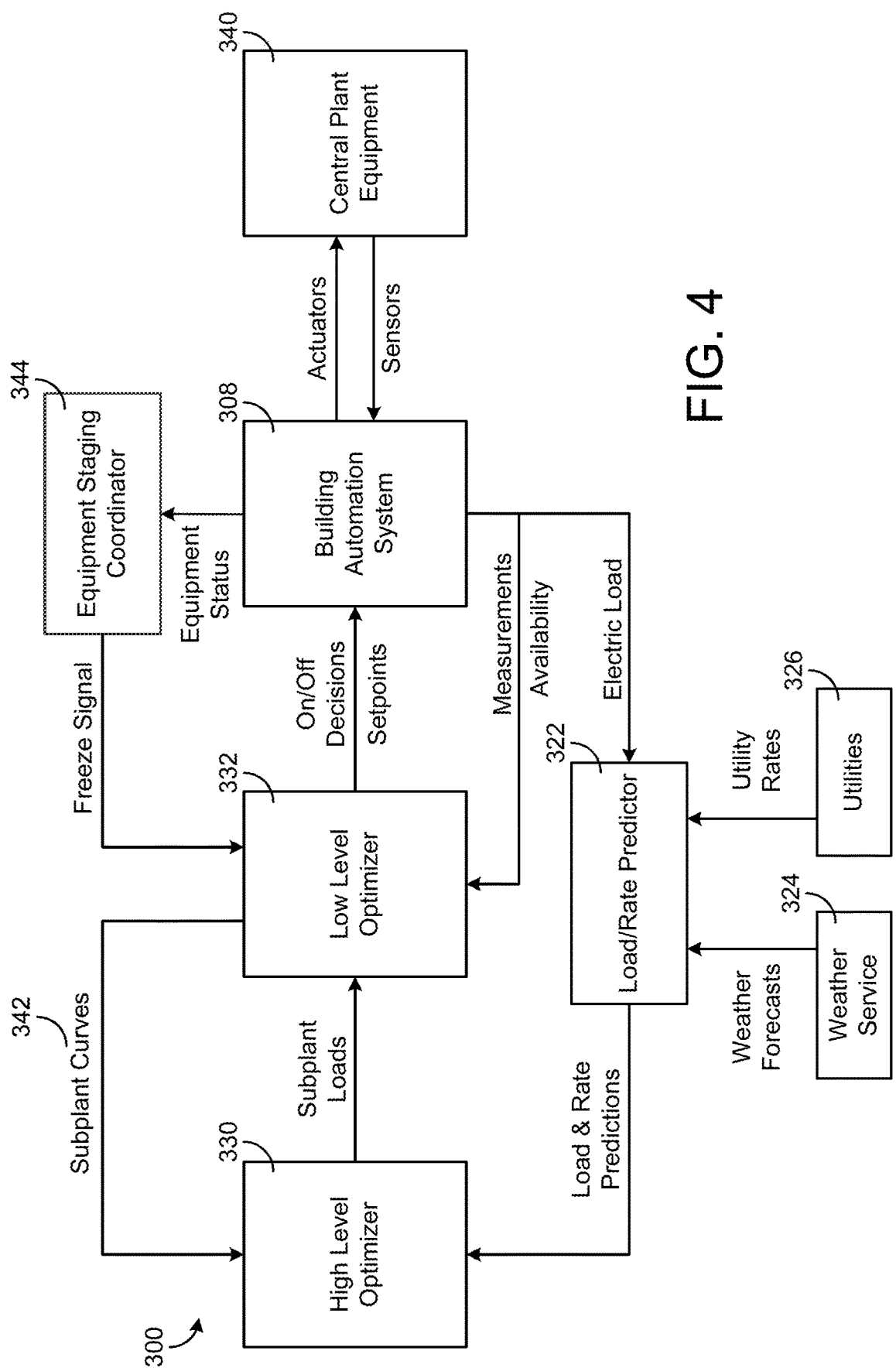
FIG. 4 is a block diagram illustrating a portion of the central plant system of FIG. 3 in greater detail and showing an equipment staging coordinator configured to coordinate the staging of HVAC equipment across multiple subplants, according to an exemplary embodiment.

Referring now to FIG. 4, a block diagram illustrating a portion of central plant system 300 in greater detail is shown, according to an exemplary embodiment. FIG. 4 illustrates the cascaded optimization process performed by central plant optimizer 328 to optimize the performance of central plant 200. In the cascaded optimization process, high level optimizer 330 performs a subplant level optimization that determines an optimal distribution of thermal energy loads across subplants 202-212 for each time step in the prediction window in order to minimize the cost of energy consumed by subplants 202-212. Low level optimizer 332 performs an equipment level optimization that determines how to best run each subplant at the subplant load setpoint determined by high level optimizer 330. For example, low level optimizer 332 may determine on/off states and/or operating setpoints for various devices of equipment 340 in order to optimize the energy consumption of each subplant while meeting the thermal energy load setpoint for the subplant.

One advantage of the cascaded optimization process performed by central plant optimizer 328 is the optimal use of computational time. For example, the subplant level optimization performed by high level optimizer 330 may use a relatively long time horizon due to the operation of the thermal energy storage. However, the equipment level optimization performed by low level optimizer 332 may use a much shorter time horizon or no time horizon at all since the low level system dynamics are relatively fast (compared to the dynamics of the thermal energy storage) and the low level control of equipment 340 may be handled by BAS 308. Such an optimal use of computational time makes it possible for central plant optimizer 328 to perform the central plant optimization in a short amount of time, allowing for real-time predictive control. For example, the short computational time enables central plant optimizer 328 to be implemented in a real-time planning tool with interactive feedback.

Another advantage of the cascaded optimization performed by central plant optimizer 328 is that the central plant optimization problem can be split into two cascaded subproblems. The cascaded configuration provides a layer of abstraction that allows high level optimizer 330 to distribute the thermal energy loads across subplants 202-212 without requiring high level optimizer 330 to know or use any details regarding the particular equipment configuration within each subplant. The interconnections between equipment 340 within each subplant may be hidden from high level optimizer 330 and handled by low level optimizer 332. For purposes of the subplant level optimization performed by high level optimizer 330, each subplant may be completely defined by one or more subplant curves 342.

Low level optimizer 332 may generate and provide subplant curves 342 to high level optimizer 330. Subplant curves 342 may indicate the rate of utility use by each of subplants 202-212 (e.g., electricity use measured in kW, water use measured in L/s, etc.) as a function of the subplant load. In some embodiments, low level optimizer 332 generates subplant curves 342 based on equipment models 320 (e.g., by combining equipment models 320 for individual devices into an aggregate curve for the subplant). Low level optimizer 332 may generate subplant curves 342 by running the low level optimization process for several different loads and weather conditions to generate multiple data points. Low level optimizer 332 may fit a curve to the data points to generate subplant curves 342. In other embodiments, low level optimizer 332 provides the data points to high level optimizer 330 and high level optimizer 330 generates the subplant curves using the data points.

High level optimizer 330 may receive the load and rate predictions from load/rate predictor 322 and the subplant curves 342 from low level optimizer 332. The load predictions may be based on weather forecasts from weather service 324 and/or information from building automation system 308 (e.g., a current electric load of the building, measurements from the building, a history of previous loads, a setpoint trajectory, etc.). The utility rate predictions may be based on utility rates received from utilities 326 and/or utility prices from another data source. High level optimizer 330 may determine the optimal load distribution for subplants 202-212 (e.g., a subplant load for each subplant) for each time step the prediction window and may provide the subplant loads as setpoints to low level optimizer 332. In some embodiments, high level optimizer 330 determines the subplant loads by minimizing the total operating cost of central plant 200 over the prediction window. In other words, given a predicted load and utility rate information from load/rate predictor 322, high level optimizer 330 may distribute the predicted load across subplants 202-212 over the optimization period to minimize operating cost.

In some instances, the optimal load distribution may include using TES subplants 210 and/or 212 to store thermal energy during a first time step for use during a later time step. Thermal energy storage may advantageously allow thermal energy to be produced and stored during a first time period when energy prices are relatively low and subsequently retrieved and used during a second time period when energy proves are relatively high. The high level optimization may be different from the low level optimization in that the high level optimization has a longer time constant due to the thermal energy storage provided by TES subplants 210-212. The high level optimization may be described by the following equation:

$$\theta_{HL}^* = \arg \min_{\theta_{HL}} J_{HL}(\theta_{HL})$$

where $\theta_{HL}^*$ contains the optimal high level decisions (e.g., the optimal load for each of subplants 202-212) for the entire optimization period and $J_{HL}$ is the high level cost function.

To find the optimal high level decisions $\theta_{HL}^*$, high level optimizer 330 may minimize the high level cost function $J_{HL}$. The high level cost function $J_{HL}$ may be the sum of the economic (e.g., monetary) costs of each utility consumed by each of subplants 202-212 for the duration of the optimization period. In some embodiments, the high level cost function $J_{HL}$ may be described using the following equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right]$$

where $n_h$ is the number of time steps k in the optimization period, $n_s$ is the number of subplants, $t_s$ is the duration of a time step, $c_{jk}$ is the economic cost of utility j at a time step k of the optimization period, and $u_{jik}$ is the rate of use of utility j by subplant i at time step k.

In some embodiments, the cost function $J_{HL}$ includes an additional demand charge term such as:

$$w_d c_{demand} \max_{n_h}(u_{elec}(\theta_{HL}), u_{max,ele})$$

where $w_d$ is a weighting term, $c_{demand}$ is the demand cost, and the max( ) term selects the peak electricity use during the applicable demand charge period. Accordingly, the high level cost function $J_{HL}$ may be described by the equation:

$$J_{HL}(\theta_{HL}) = \sum_{k=1}^{n_h} \sum_{i=1}^{n_s} \left[ \sum_{j=1}^{n_u} t_s \cdot c_{jk} u_{jik}(\theta_{HL}) \right] + w_d c_{demand} \max_{n_h}(u_{elec}(\theta_{HL}), u_{max,ele})$$

The decision vector $\theta_{HL}$ may be subject to several constraints. For example, the constraints may require that the subplants not operate at more than their total capacity, that the thermal storage not charge or discharge too quickly or under/over flow for the tank, and that the thermal energy loads for the building or campus are met. These restrictions may lead to both equality and inequality constraints on the high level optimization problem.

In some embodiments, the high level optimization performed by high level optimizer 330 is the same or similar to the high level optimization process described in U.S. patent application Ser. No. 14/634,609 filed Feb. 27, 2015 and titled "High Level Central Plant Optimization," the entire disclosure of which is incorporated by reference herein. High level optimizer 330 may include some or all of the features and/or functionality of the high level optimization module described in U.S. patent application Ser. No. 14/634,609.

Still referring to FIG. 4, low level optimizer 332 may use the subplant loads determined by high level optimizer 330 to determine optimal low level decisions $\theta_{LL}^*$ (e.g. binary on/off decisions, flow setpoints, temperature setpoints, etc.) for equipment 340. The low level optimization process may be performed for each of subplants 202-212. In various embodiments, the low level optimization process may be performed by centralized low level optimizer 332 that performs a separate low level optimization for each of subplants 202-212 or by a set of subplant level controllers that operate within each subplant (e.g., each subplant controller running an instance of low level optimizer 332). Low level optimizer 332 may be responsible for determining which devices of the subplant to use and/or the operating setpoints for such devices that will achieve the subplant load setpoint while minimizing energy consumption. The low level optimization may be described using the following equation:

$$\theta_{LL}^* = \arg \min_{\theta_{LL}} J_{LL}(\theta_{LL})$$

where $\theta_{LL}^*$ contains the optimal low level decisions and $J_{LL}$ is the low level cost function.

To find the optimal low level decisions $\theta_{LL}^*$, low level optimizer 332 may minimize the low level cost function $J_{LL}$. The low level cost function $J_{LL}$ may represent the total energy consumption for all of equipment 340 in the applicable subplant. The low level cost function $J_{LL}$ may be described using the following equation:

$$J_{LL}(\theta_{LL}) = \sum_{j=1}^{N} t_s \cdot b_j \cdot u_j(\theta_{LL})$$

where N is the number of devices of equipment 340 in the subplant, $t_s$ is the duration of a time step, $b_j$ is a binary on/off decision (e.g., 0=off, 1=on), and $u_j$ is the energy used by device j as a function of the setpoint $\theta_{LL}$. Each device may have continuous variables which can be changed to determine the lowest possible energy consumption for the overall input conditions.

Low level optimizer 332 may minimize the low level cost function $J_{LL}$ subject to inequality constraints based on the capacities of equipment 340 and equality constraints based on energy and mass balances. In some embodiments, the optimal low level decisions $\theta_{LL}^*$ are constrained by switching constraints defining a short horizon for maintaining a device in an on or off state after a binary on/off switch. The switching constraints may prevent devices from being rapidly cycled on and off. In some embodiments, low level optimizer 332 performs the equipment level optimization without considering system dynamics. The optimization process may be slow enough to safely assume that the equipment control has reached its steady-state. Thus, low level optimizer 332 may determine the optimal low level decisions $\theta_{LL}^*$ at an instance of time rather than over a long horizon.

In some embodiments, the optimal low level decisions $\theta_{LL}^*$ are constrained by an equipment staging coordinator 344 that prevents two or more of subplants 202-212 from reacting to a change in the subplant load too quickly after a change in another of subplants 202-212 has occurred. For example, equipment staging coordinator 344 is shown receiving equipment status information from BAS 308. Equipment staging coordinator 344 may use the equipment status information to determine when the equipment 340 within a given subplant has been staged (e.g., turned on/off). Equipment staging coordinator 344 may prevent multiple subplants from staging their equipment 340 simultaneously or within a predetermined time period after another subplant has staged its equipment 340. Advantageously, this functionality reduces the peak energy consumption for central plant 200 at any instant in time and results in a lower demand charge.

In some embodiments, equipment staging coordinator 344 causes low level optimizer 332 to halt its efficiency calculations and hold the optimal low level decisions $\theta_{LL}^*$ for a given subplant at previously-determined values shortly after the equipment 340 for another subplant has been staged (e.g., by providing a freeze signal to low level optimizer 332). Once a threshold time has passed since the equipment 340 for the other subplant has been staged, equipment staging coordinator 344 may allow low level optimizer 332 to resume its efficiency calculations and to determine new values for the optimal low level decisions $\theta_{LL}^*$ (e.g., by withdrawing the freeze signal). Equipment staging coordinator 344 is described in greater detail with reference to FIGS. 5-7D.

Low level optimizer 332 may determine optimum operating statuses (e.g., on or off) for a plurality of devices of equipment 340. According to an exemplary embodiment, the on/off combinations may be determined using binary optimization and quadratic compensation. Binary optimization may minimize a cost function representing the power consumption of devices in the applicable subplant. In some embodiments, non-exhaustive (i.e., not all potential combinations of devices are considered) binary optimization is used. Quadratic compensation may be used in considering devices whose power consumption is quadratic (and not linear). Low level optimizer 332 may also determine optimum operating setpoints for equipment using nonlinear optimization. Nonlinear optimization may identify operating setpoints that further minimize the low level cost function $J_{LL}$. Low level optimizer 332 may provide the on/off decisions and setpoints to building automation system 308 for use in controlling the central plant equipment 340.

In some embodiments, the low level optimization performed by low level optimizer 332 is the same or similar to the low level optimization process described in U.S. patent application Ser. No. 14/634,615 filed Feb. 27, 2015 and titled "Low Level Central Plant Optimization," the entire disclosure of which is incorporated by reference herein. Low level optimizer 332 may include some or all of the features and/or functionality of the low level optimization module described in U.S. patent application Ser. No. 14/634,615.

Coordinated HVAC Equipment Staging Across Multiple Subplants

Figure 5:
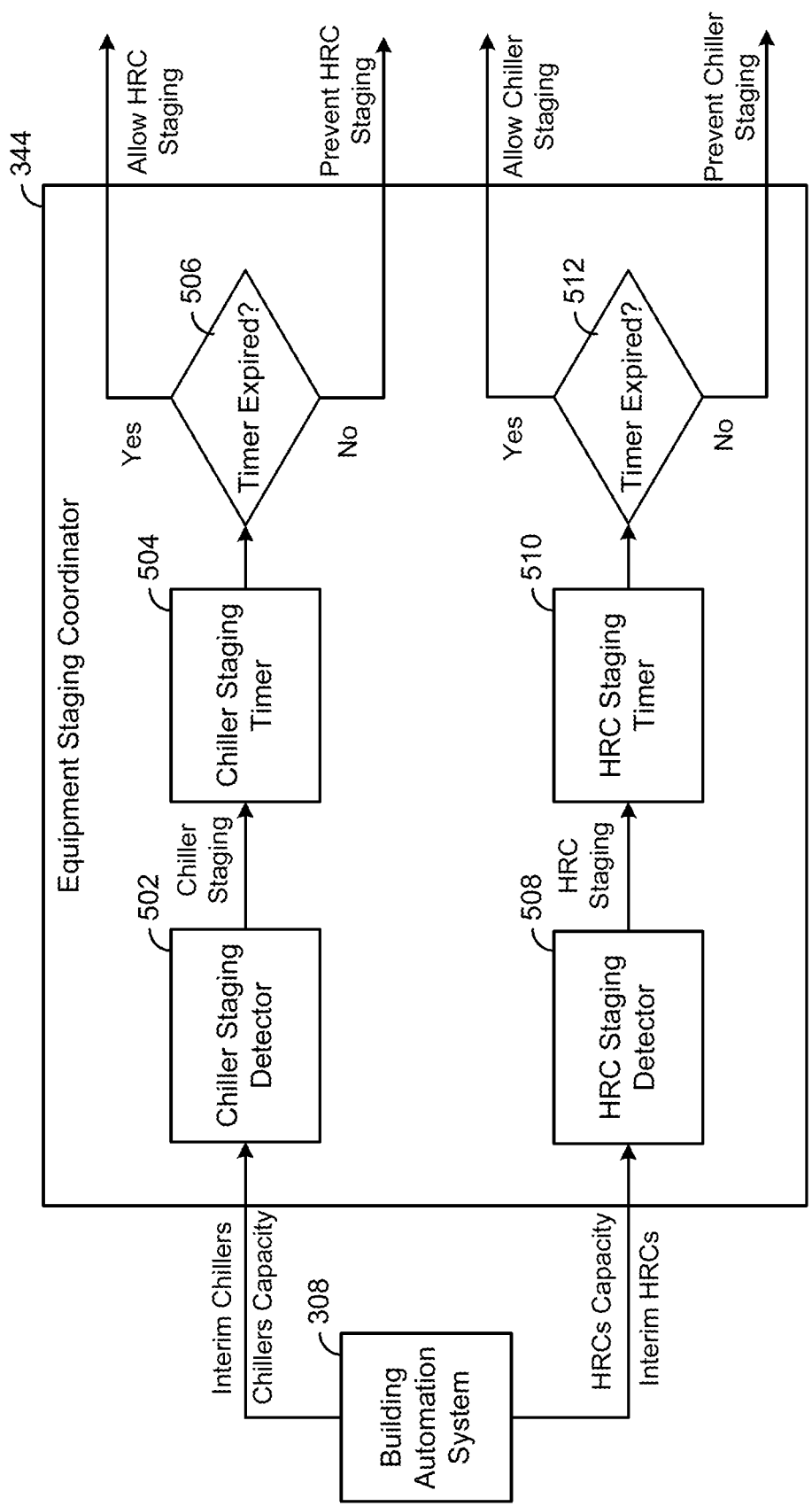
FIG. 5 is a block diagram illustrating the equipment staging coordinator of FIG. 4 in greater detail, according to an exemplary embodiment.
Figure 6:
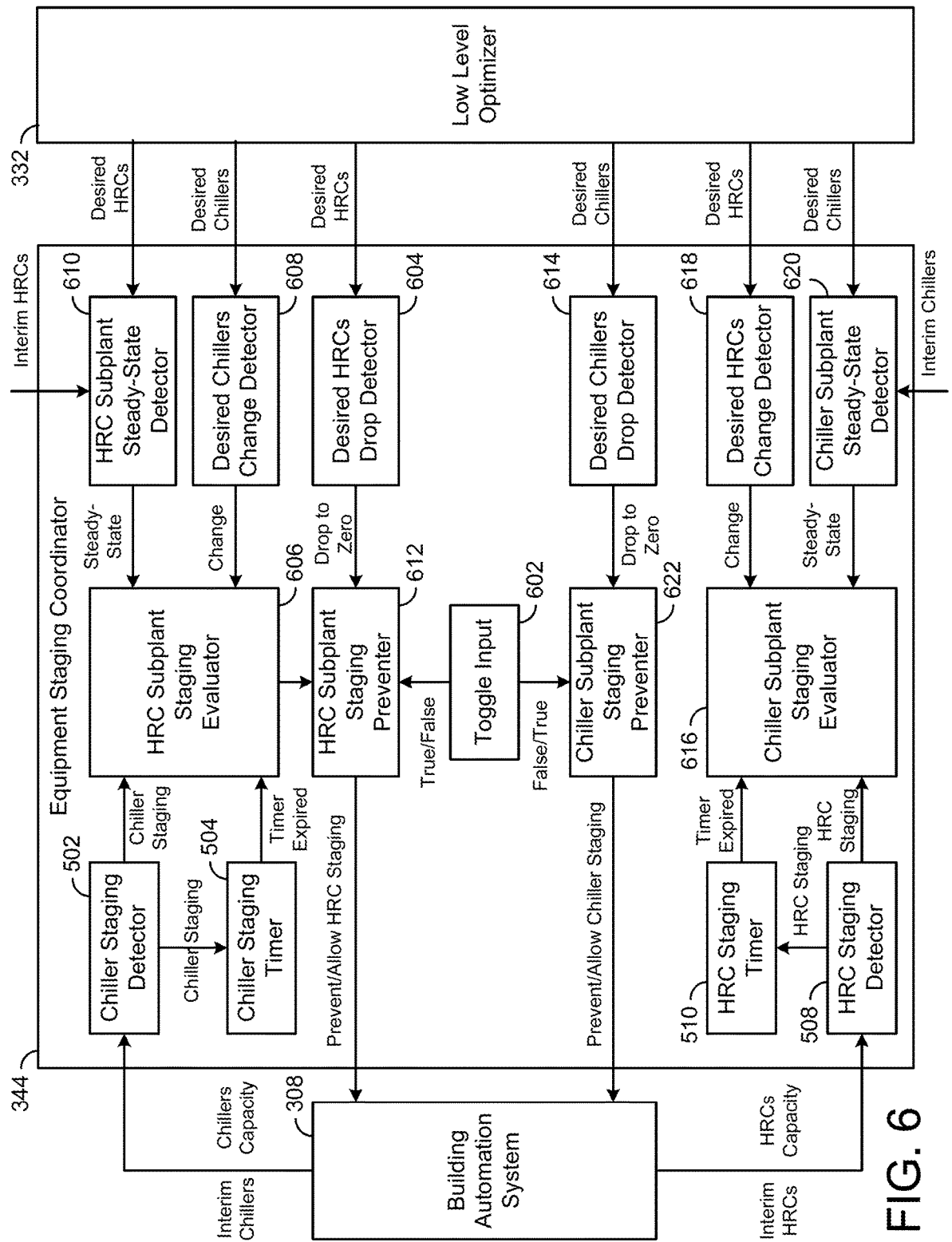
FIG. 6 is a block diagram illustrating the equipment staging coordinator of FIG. 4 in greater detail, according to an exemplary embodiment.

Referring now to FIGS. 5-7, several block diagrams illustrating equipment staging coordinator 344 in greater detail is shown, according to an exemplary embodiment. In some embodiments, equipment staging coordinator 344 is a component of central plant controller 302. Equipment staging coordinator 344 may be configured to coordinate the staging (e.g., turning on/off, activating/deactivating, etc.) of HVAC equipment across multiple subplants. For example, equipment staging coordinator 344 may prevent each of subplants 202-212 from reacting to a change in the building load (e.g., a change in the load setpoint received from high level optimizer 330) too quickly (e.g., within a predetermined time period) after a change in another subplant has occurred.

Some types of HVAC equipment require more power (i.e., energy per unit time) when they are initially started or activated than they do under steady-state operation. For example, the chillers 232 within chiller subplant 206 and the heat recovery chillers (HRCs) 226 within heat recovery chiller subplant 204 may cause a temporary spike in energy consumption when they are initially started or activated. A cooling load can be met by activating chillers 232 and/or HRCs 226. In some instances, an increase in cooling load may cause the load setpoints for HRC subplant 204 and chiller subplant 206 to increase simultaneously. However, if both chillers 232 and HRCs 226 are staged at the same time, the resultant spikes in energy consumption can stack on top of each other, causing a high peak energy consumption. A high peak energy consumption may be undesirable since it increases the maximum rate of utility consumption (e.g., maximum rate of electricity usage) used by a utility provider to calculate the demand charge.

Advantageously, equipment staging coordinator 344 may reduce the peak energy consumption of central plant 200 by preventing multiple subplants from staging their equipment at the same time and/or within the same time period. In some embodiments, equipment staging coordinator 344 prevents two or more of subplants 202-212 from staging their equipment 340 simultaneously. In some embodiments, equipment staging coordinator 344 prevents a first subplant (e.g., any of subplants 202-212) from staging equipment of the first subplant within a predetermined time period after a second subplant (e.g., any other of subplants 202-212) has staged equipment of the second subplant. By preventing multiple subplants from staging their equipment at the same time or within the same time period, equipment staging coordinator 344 ensures that any temporary spikes in energy consumption do not stack on top of each other, thereby reducing the maximum energy consumption used to calculate the demand charge.

In some embodiments, equipment staging coordinator 344 coordinates the staging of chillers 232 and HRCs 226 across chiller subplant 206 and HRC subplant 204. However, it should be understood that the current invention is not limited to any particular type of equipment or subplants. Chillers 232 and HRCs 226 are provided merely as examples to illustrate the features of equipment staging coordinator 344. It is contemplated that equipment staging coordinator 344 can be used to coordinate the staging of any type of equipment across any of subplants 202-212. For example, equipment staging coordinator 344 may be configured to coordinate the staging of heaters 220 in heater subplant 202 with HRCs 226 in HRC subplant 204. In some embodiments, equipment staging coordinator 344 coordinates the staging of cooling towers 238, pumps, fans, or any other type of equipment across subplants 202-212. It is also contemplated that equipment staging coordinator 344 can be used to coordinate the staging of equipment across multiple plants, multiple buildings, multiple HVAC systems within the same building, and/or across any two or more systems or subsystems. The remainder of this disclosure describes an exemplary embodiment in which equipment staging coordinator 344 coordinates the staging of chillers 232 and HRCs 226 across chiller subplant 206 and HRC subplant 204.

Referring particularly to FIG. 5, equipment staging coordinator 344 is shown to include a chiller staging detector 502 and a chiller staging timer 504. Chiller staging detector 502 may be configured to detect the staging of chillers 232 within chiller subplant 206. Staging chillers 232 may include activating or deactivating one or more of chillers 232 and/or changing the capacity of the set of chillers 232 (e.g., by adding or removing active chillers, adjusting the capacity limits of individual chillers, etc.). Staging chillers 232 may include turning on/off one or more of chillers 232, increasing or decreasing the load setpoints or flow rates through chillers 232, and/or any other change to chillers 232 that affects the cooling load provided by chillers 232.

In some embodiments, chiller staging detector 502 receives an input from BAS 308 or chiller subplant 206 indicating the current status of chillers 232 (e.g., the capacity of chillers 232, a list of active chillers 232, etc.). In some embodiments, chiller staging detector 502 receives an input from BAS 308 or chiller subplant 206 indicating which of chillers 232 are currently being commanded. The chillers 232 that are currently being commanded are referred to herein as "interim chillers." The interim chillers may be a set of chillers 232 that are currently receiving staging commands from BAS 308 or chiller subplant 206 with the intent of moving toward the optimal set of chillers 232 determined by low level optimizer 332. The optimal set of chillers 232 determined by low level optimizer 332 may be referred to herein as "desired chillers." Chiller staging detector 502 may use the inputs from BAS 308 or chiller subplant 206 to determine whether chillers 232 are currently being staged.

In response to a determination by chiller staging detector 502 that chillers 232 are currently being staged, chiller staging detector 502 may provide a chiller staging signal to chiller staging timer 504. The chiller staging signal may cause chiller staging timer 504 to reset to a predetermined value. In some embodiments, the predetermined value is greater than or equal to the duration of the optimization period used by low level optimizer 332 to determine the set of desired chillers. In some embodiments, the predetermined value is greater than or equal to the duration of a demand charge period or a period used by a utility provider to determine the maximum rate of energy consumption. In some embodiments, the predetermined value is greater than or equal to an estimated time for chillers 232 to reach steady-state after an initial startup.

Chiller staging timer 504 may countdown from the predetermined value and may reset to the predetermined value each time the chiller staging signal is received. Equipment staging coordinator 344 may be configured to monitor chiller staging timer 504 to determine whether chiller staging timer 504 has expired. If chiller staging timer 504 is not expired (i.e., the result of the determination in block 506 is "no"), equipment staging coordinator 344 may prevent HRC subplant 204 from staging HRCs 226. However, if chiller staging timer 504 is expired (i.e., the result of the determination in block 506 is "yes"), equipment staging coordinator 344 may allow HRC subplant 204 to stage HRCs 226.

Still referring to FIG. 5, equipment staging coordinator 344 may use a similar process to determine whether to allow or prevent chiller subplant 206 from staging chillers 232. For example, equipment staging coordinator 344 is shown to include a HRC staging detector 508 and a HRC staging timer 510. HRC staging detector 508 may be configured to detect the staging of HRCs 226 within HRC subplant 204. Staging HRCs 226 may include activating or deactivating one or more of HRCs 226 and/or changing the capacity of the set of HRCs 226 (e.g., by adding or removing active HRCs, adjusting the capacity limits of individual HRCs, etc.). Staging HRCs 226 may include turning on/off one or more of HRCs 226, increasing or decreasing the load setpoints or flow rates through HRCs 226, and/or any other change to HRCs 226 that affects the cooling load provided by HRCs 226.

In some embodiments, HRC staging detector 508 receives an input from BAS 308 or HRC subplant 204 indicating the current status of HRCs 226 (e.g., the capacity of HRCs 226, a list of active HRCs 226, etc.). In some embodiments, HRC staging detector 508 receives an input from BAS 308 or HRC subplant 204 indicating which of HRCs 226 are currently being commanded. The HRCs 226 that are currently being commanded are referred to herein as "interim HRCs." The interim HRCs may be a set of HRCs 226 that are currently receiving staging commands from BAS 308 or HRC subplant 204 with the intent of moving toward the optimal set of HRCs 226 determined by low level optimizer 332. The optimal set of HRCs 226 determined by low level optimizer 332 may be referred to herein as "desired HRCs." HRC staging detector 508 may use the inputs from BAS 308 or HRC subplant 204 to determine whether HRCs 226 are currently being staged.

In response to a determination by HRC staging detector 508 that HRCs 226 are currently being staged, HRC staging detector 508 may provide a HRC staging signal to HRC staging timer 510. The HRC staging signal may cause HRC staging timer 510 to reset to a predetermined value. In some embodiments, the predetermined value is greater than or equal to the duration of the optimization period used by low level optimizer 332 to determine the set of desired HRCs. In some embodiments, the predetermined value is greater than or equal to the duration of a demand charge period or a period used by a utility provider to determine the maximum rate of energy consumption. In some embodiments, the predetermined value is greater than or equal to an estimated time for HRCs 226 to reach steady-state after an initial startup.

HRC staging timer 510 may countdown from the predetermined value and may reset to the predetermined value each time the HRC staging signal is received. Equipment staging coordinator 344 may be configured to monitor HRC staging timer 510 to determine whether HRC staging timer 510 has expired. If HRC staging timer 510 is not expired (i.e., the result of the determination in block 512 is "no"), equipment staging coordinator 344 may prevent chiller subplant 206 from staging chillers 232. However, if HRC staging timer 510 is expired (i.e., the result of the determination in block 512 is "yes"), equipment staging coordinator 344 may allow chiller subplant 206 to stage chillers 232.

As shown in FIG. 5, equipment staging coordinator 344 may prevent each of subplants 204-206 from staging its equipment until a threshold amount of time has passed since the other subplant has staged its equipment. For example, equipment staging coordinator 344 may prevent HRC subplant 204 from staging HRCs 226 until a threshold amount of time has passed since chiller subplant 206 has staged chillers 232. The threshold amount of time may be defined by chiller staging timer 504, which may be reset each time chillers 232 are staged. Similarly, equipment staging coordinator 344 may prevent chiller subplant 206 from staging chillers 232 until a threshold amount of time has passed since HRC subplant 204 has staged HRCs 226. The threshold amount of time may be defined by HRC staging timer 510, which may be reset each time HRCs 226 are staged.

Referring now to FIG. 6, a block diagram illustrating equipment staging coordinator 344 in greater detail is shown, according to an exemplary embodiment. Equipment staging coordinator 344 is shown to include chiller staging detector 502, chiller staging timer 504, HRC staging detector 508, and HRC staging timer 510, which may be the same as described with reference to FIG. 5. In the embodiment shown in FIG. 6, equipment staging coordinator 344 may prevent or allow equipment staging based on several factors in addition to whether timers 504 and 510 are expired. For example, equipment staging coordinator 344 is shown to include a HRC subplant staging preventer 612. HRC subplant staging preventer 612 may be configured to determine whether to prevent HRC staging or allow HRC staging based on inputs received from a desired HRCs drop detector 604, a toggle input 602, and a HRC subplant staging evaluator 606.

Desired HRCs drop detector 604 may receive an input of the desired HRCs from low level optimizer 332. The desired HRCs may be the set of HRCs 226 determined by low level optimizer 332 as being the optimal set of HRCs 226 to meet the cooling load for HRC subplant 204. Desired HRCs drop detector 604 may determine whether the desired HRCs has dropped to zero (i.e., changed from a non-zero value to a zero value, changed from a non-empty set to an empty set, etc.). The desired HRCs may drop to zero, for example, if HRC subplant 204 has been disabled, the load setpoint for HRC subplant 204 has dropped to zero, and/or if the entire set of HRCs 226 have been disabled. If the desired HRCs has dropped to zero, desired HRCs drop detector 604 may provide a "drop to zero" signal to HRC subplant staging preventer 612. In some embodiments, HRC subplant staging preventer 612 is configured to allow HRC staging in response to receiving the drop to zero signal from desired HRCs drop detector 604, regardless of other inputs to HRC subplant staging preventer 612. If the desired HRCs has not dropped to zero, HRC subplant staging preventer 612 may use inputs from toggle input 602 and/or HRC subplant staging evaluator 606 to determine whether to allow or prevent HRC staging.

Toggle input 602 may be configured to toggle between binary values (e.g., true/false, on/off, I/O, etc.) and may provide opposite inputs to HRC subplant staging preventer 612 and chiller subplant staging preventer 622. For example, if toggle input 602 provides an input of "true" to HRC subplant staging preventer 612, toggle input 602 may provide an input of "false" to chiller subplant staging preventer 622. Similarly, if toggle input 602 provides an input of "false" to HRC subplant staging preventer 612, toggle input 602 may provide an input of "true" to chiller subplant staging preventer 622. In some embodiments, toggle input 602 toggles between binary inputs on a periodic basis (e.g., every 30 seconds, every 15 minutes, etc.). In other embodiments, toggle input 602 toggles between binary inputs in response to an input from BAS 308, subplants 202-212, or central plant controller 302. Advantageously, toggle input 602 may ensure that at least one of HRC subplant 204 and chiller subplant 206 is always at steady state by preventing HRC subplant 204 and chiller subplant 206 from staging their equipment simultaneously.

If HRC subplant staging preventer 612 receives a first binary input (e.g., "true") from toggle input 602, HRC subplant staging preventer 612 may prevent HRC staging regardless of the input from HRC subplant staging evaluator 606. However, if HRC subplant staging preventer 612 receives an opposite binary input (e.g., "false") from toggle input 602, HRC subplant staging preventer 612 may use the input from HRC subplant staging evaluator 606 to determine whether to allow or prevent HRC staging.

HRC subplant staging evaluator 606 is shown receiving inputs from chiller staging detector 502, chiller staging timer 504, a HRC subplant steady state detector 610, and a desired chillers change detector 608. Chiller staging detector 502 may provide HRC subplant staging evaluator 606 with a chiller staging input indicating whether any of the chillers 232 within chiller subplant 206 are currently being staged. Chiller staging timer 504 may reset each time chiller staging is detected and may provide HRC subplant staging evaluator 606 with an input indicating whether the chiller staging timer 504 has expired.

HRC subplant steady state detector 610 may provide HRC subplant staging evaluator 606 with an input indicating whether HRC subplant 204 is at steady state. In some embodiments, HRC subplant steady state detector 610 determines that HRC subplant 204 is at steady state if the set of desired HRCs from low level optimizer 332 (e.g., the optimal set of HRCs 226 to meet a cooling load) and the set of interim HRCs (e.g., the set of HRCs 226 currently being commanded) are equal. Conversely, HRC subplant steady state detector 610 may determine that HRC subplant 204 is not at steady state if the set of desired HRCs and the set of interim HRCs are not equal.

Desired chillers change detector 608 may provide HRC subplant staging evaluator 606 with an input indicating whether chiller subplant 206 is at steady state. In some embodiments, desired chillers change detector 608 determines that chiller subplant 206 is at steady state if the set of desired chillers from low level optimizer 332 (e.g., the optimal set of chillers 232 to meet a cooling load) has not recently changed. Conversely, desired chillers change detector 608 may determine that chiller subplant 206 is not at steady state if the set of desired chillers has recently changed.

HRC subplant staging evaluator 606 may use the inputs from chiller staging detector 502, chiller staging timer 504, HRC subplant steady state detector 610, and desired chillers change detector 608 to determine whether it is desired to prevent HRC subplant 204 from staging its equipment. In some embodiments, HRC subplant staging evaluator 606 determines that it is desired to prevent HRC subplant 204 from staging its equipment when one or more of the following factors is true: (a) chiller staging detector 502 reports that chiller subplant 206 is currently staging its equipment, (b) HRC subplant steady state detector 610 reports that HRC subplant 204 is at steady state, and/or (c) desired chillers change detector 608 reports that chiller subplant 206 is not at steady state. In some embodiments, HRC subplant staging evaluator 606 determines that it is desired to prevent HRC subplant 204 from staging its equipment in response to all of factors (a)-(c) being true.

When HRC subplant staging evaluator 606 determines that it is desired to prevent HRC subplant 204 from staging its equipment, HRC subplant staging evaluator 606 may send a "prevent staging" signal (e.g., a binary signal) to HRC subplant staging preventer 612 to prevent HRC equipment staging (e.g., prevent HRC equipment staging=true). Conversely, when HRC subplant staging evaluator 606 determines that it is not desired to prevent HRC subplant 204 from staging its equipment, HRC subplant staging evaluator 606 may send an "allow staging" signal to HRC subplant staging preventer 612 to allow HRC equipment staging (e.g., prevent HRC equipment staging=false).

In some embodiments, HRC subplant staging evaluator 606 includes a logical latch configured to provide a fixed output until the latch is reset. The latch may be triggered in response to HRC subplant staging evaluator 606 providing the prevent staging signal and may cause HRC subplant staging evaluator 606 to continue providing the prevent staging signal until the latch is reset. In other words, once HRC subplant staging evaluator 606 determines that it is desired to prevent HRC equipment staging, HRC subplant staging evaluator 606 may continue to provide the prevent staging signal to HRC subplant staging preventer 612 until the latch is reset. In some embodiments, the latch can be reset in response to a signal from chiller staging timer 504 that the timer has expired. Once the latch is reset, HRC subplant staging evaluator 606 may provide HRC subplant staging preventer 612 with the allow staging signal until HRC subplant staging evaluator 606 determines once again that it is desired to prevent HRC equipment staging.

HRC subplant staging preventer 612 may evaluate the inputs from HRC subplant staging evaluator 606, toggle input 602, and desired HRCs drop detector 604 to determine whether to prevent or allow HRC equipment staging. In some embodiments, HRC subplant staging preventer 612 allows HRC equipment staging in response to receiving the drop to zero input from desired HRCs drop detector 604, regardless of the inputs from HRC subplant staging evaluator 606 and toggle input 602. If desired HRCs drop detector 604 does not provide the drop to zero input, HRC subplant staging preventer 612 may prevent HRC equipment staging in response to one or both of the following factors: (a) toggle input 602 providing a particular binary input (e.g., true) or (b) HRC subplant staging evaluator 606 providing the prevent staging signal. If either (or both) of factors (a)-(b) are true, HRC subplant staging preventer 612 may prevent HRC equipment staging.

In some embodiments, HRC subplant staging preventer 612 prevents HRC equipment staging by providing a HRC freeze signal to low level optimizer 332 or an instance of low level optimizer configured to optimize HRC subplant 204. The HRC freeze signal may cause low level optimizer 332 to halt its efficiency calculations and/or optimization routine for HRC subplant 204, thereby preventing the set of desired HRCs from changing until the freeze signal is removed. In other embodiments, HRC subplant staging preventer 612 prevents HRC equipment staging by providing a HRC freeze signal to BAS 308 and/or HRC subplant 204 (e.g., a subplant level controller for HRC subplant 204). The HRC freeze signal may cause BAS 308 and/or HRC subplant 204 to maintain the HRC equipment in its current state, thereby preventing HRC equipment staging from occurring.

Still referring to FIG. 6, equipment staging coordinator 344 is shown to include similar components configured to determine whether to allow or prevent chiller subplant 206 from staging its equipment. For example, equipment staging coordinator 344 is shown to include a chiller subplant staging preventer 622. Chiller subplant staging preventer 622 may be configured to determine whether to prevent chiller staging or allow chiller staging based on inputs received from a desired chillers drop detector 614, toggle input 602, and a chiller subplant staging evaluator 616.

Desired chillers drop detector 614 may receive an input of the desired chillers from low level optimizer 332. The desired chillers may be the set of chillers 232 determined by low level optimizer 332 as being the optimal set of chillers 232 to meet the cooling load for chiller subplant 206. Desired chillers drop detector 614 may determine whether the desired chillers has dropped to zero (i.e., changed from a non-zero value to a zero value, changed from a non-empty set to an empty set, etc.). The desired chillers may drop to zero, for example, if chiller subplant 206 has been disabled, the load setpoint for chiller subplant 206 has dropped to zero, and/or if the entire set of chillers 232 have been disabled. If the desired chillers has dropped to zero, desired chillers drop detector 614 may provide a "drop to zero" signal to chiller subplant staging preventer 622. In some embodiments, chiller subplant staging preventer 622 is configured to allow chiller staging in response to receiving the drop to zero signal from desired chillers drop detector 614, regardless of other inputs to chiller subplant staging preventer 622. If the desired chillers has not dropped to zero, chiller subplant staging preventer 622 may use inputs from toggle input 602 and/or chiller subplant staging evaluator 616 to determine whether to allow or prevent chiller staging.

If chiller subplant staging preventer 622 receives a first binary input (e.g., "true") from toggle input 602, chiller subplant staging preventer 622 may prevent chiller staging regardless of the input from chiller subplant staging evaluator 616. However, if chiller subplant staging preventer 622 receives an opposite binary input (e.g., "false") from toggle input 602, chiller subplant staging preventer 622 may use the input from chiller subplant staging evaluator 616 to determine whether to allow or prevent chiller staging.

Chiller subplant staging evaluator 616 is shown receiving inputs from HRC staging detector 508, HRC staging timer 510, a chiller subplant steady state detector 620, and a desired HRCs change detector 618. HRC staging detector 508 may provide chiller subplant staging evaluator 616 with a HRC staging input indicating whether any of the HRCs 226 within HRC subplant 204 are currently being staged. HRC staging timer 510 may reset each time HRC staging is detected and may provide chiller subplant staging evaluator 616 with an input indicating whether the HRC staging timer 510 has expired.

Chiller subplant steady state detector 620 may provide chiller subplant staging evaluator 616 with an input indicating whether chiller subplant 206 is at steady state. In some embodiments, chiller subplant steady state detector 620 determines that chiller subplant 206 is at steady state if the set of desired chillers from low level optimizer 332 (e.g., the optimal set of chillers 232 to meet a cooling load) and the set of interim chillers (e.g., the set of chillers 232 currently being commanded) are equal. Conversely, chiller subplant steady state detector 620 may determine that chiller subplant 206 is not at steady state if the set of desired chillers and the set of interim chillers are not equal.

Desired HRCs change detector 618 may provide chiller subplant staging evaluator 616 with an input indicating whether HRC subplant 204 is at steady state. In some embodiments, desired HRCs change detector 618 determines that HRC subplant 204 is at steady state if the set of desired HRCs from low level optimizer 332 (e.g., the optimal set of HRCs 226 to meet a cooling load) has not recently changed. Conversely, desired HRCs change detector 618 may determine that HRC subplant 204 is not at steady state if the set of desired HRCs has recently changed.

Chiller subplant staging evaluator 616 may use the inputs from HRC staging detector 508, HRC staging timer 510, chiller subplant steady state detector 620, and desired HRCs change detector 618 to determine whether it is desired to prevent chiller subplant 206 from staging its equipment. In some embodiments, chiller subplant staging evaluator 616 determines that it is desired to prevent chiller subplant 206 from staging its equipment when one or more of the following factors is true: (a) HRC staging detector 508 reports that HRC subplant 204 is currently staging its equipment, (b) chiller subplant steady state detector 620 reports that chiller subplant 206 is at steady state, and/or (c) desired HRCs change detector 618 reports that HRC subplant 204 is not at steady state. In some embodiments, chiller subplant staging evaluator 616 determines that it is desired to prevent chiller subplant 206 from staging its equipment in response to all of factors (a)-(c) being true.

When chiller subplant staging evaluator 616 determines that it is desired to prevent chiller subplant 206 from staging its equipment, chiller subplant staging evaluator 616 may send a "prevent staging" signal (e.g., a binary signal) to chiller subplant staging preventer 622 to prevent chiller equipment staging (e.g., prevent chiller equipment staging=true). Conversely, when chiller subplant staging evaluator 616 determines that it is not desired to prevent chiller subplant 206 from staging its equipment, chiller subplant staging evaluator 616 may send an "allow staging" signal to chiller subplant staging preventer 622 to allow chiller equipment staging (e.g., prevent chiller equipment staging=false).

In some embodiments, chiller subplant staging evaluator 616 includes a logical latch configured to provide a fixed output until the latch is reset. The latch may be triggered in response to chiller subplant staging evaluator 616 providing the prevent staging signal and may cause chiller subplant staging evaluator 616 to continue providing the prevent staging signal until the latch is reset. In other words, once chiller subplant staging evaluator 616 determines that it is desired to prevent chiller equipment staging, chiller subplant staging evaluator 616 may continue to provide the prevent staging signal to chiller subplant staging preventer 622 until the latch is reset. In some embodiments, the latch can be reset in response to a signal from HRC staging timer 510 that the timer has expired. Once the latch is reset, chiller subplant staging evaluator 616 may provide chiller subplant staging preventer 622 with the allow staging signal until chiller subplant staging evaluator 616 determines once again that it is desired to prevent chiller equipment staging.

Chiller subplant staging preventer 622 may evaluate the inputs from chiller subplant staging evaluator 616, toggle input 602, and desired chillers drop detector 614 to determine whether to prevent or allow chiller equipment staging. In some embodiments, chiller subplant staging preventer 622 allows chiller equipment staging in response to receiving the drop to zero input from desired chillers drop detector 614, regardless of the inputs from chiller subplant staging evaluator 616 and toggle input 602. If desired chillers drop detector 614 does not provide the drop to zero input, chiller subplant staging preventer 622 may prevent chiller equipment staging in response to one or both of the following factors: (a) toggle input 602 providing a particular binary input (e.g., true) or (b) chiller subplant staging evaluator 616 providing the prevent staging signal. If either (or both) of factors (a)-(b) are true, chiller subplant staging preventer 622 may prevent chiller equipment staging.

In some embodiments, chiller subplant staging preventer 622 prevents chiller equipment staging by providing a chiller freeze signal to low level optimizer 332 or an instance of low level optimizer configured to optimize chiller subplant 206. The chiller freeze signal may cause low level optimizer 332 to halt its efficiency calculations and/or optimization routine for chiller subplant 206, thereby preventing the set of desired chillers from changing until the freeze signal is removed. In other embodiments, chiller subplant staging preventer 622 prevents chiller equipment staging by providing a chiller freeze signal to BAS 308 and/or chiller subplant 206 (e.g., a subplant level controller for chiller subplant 206). The chiller freeze signal may cause BAS 308 and/or chiller subplant 206 to maintain the chiller equipment in its current state, thereby preventing chiller equipment staging from occurring.

Subplant Staging Coordination Logic

Figure 7A:
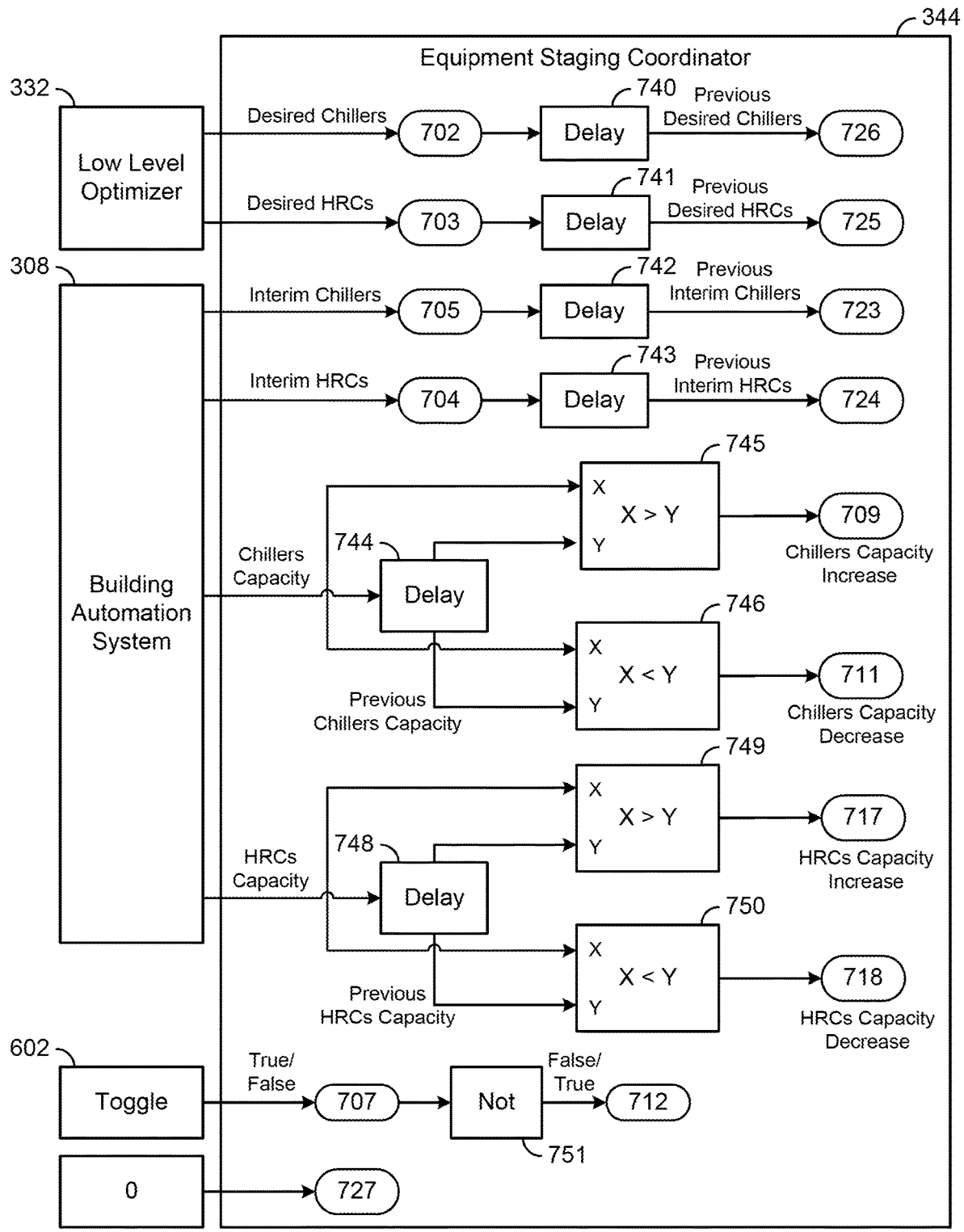
FIG. 7A is a block diagram illustrating a set of inputs which may be provided to the equipment staging coordinator of FIG. 4, according to an exemplary embodiment.

Referring now to FIGS. 7A-7D, a set of block diagrams illustrating the logic used by equipment staging coordinator 344 to determine whether to allow or prevent subplant equipment staging is shown, according to an exemplary embodiment. Referring particularly to FIG. 7A, a set of inputs which may be provided to equipment staging coordinator 344 are shown. The inputs shown in FIG. 7A may be received from BAS 308, low level optimizer 332, other components of central plant controller 302, or from any other data source.

Equipment staging coordinator 344 is shown receiving a desired chillers input 702 and a desired HRCs input 703 from low level optimizer 332. As previously described, desired chillers input 702 and desired HRCs input 703 may indicate the optimal set of chillers and HRCs, respectively, selected by low level optimizer to meet the cooling load setpoints for chiller subplant 206 and HRC subplant 204. Equipment staging coordinator 344 may apply a delay element 740 to desired chillers input 702 to generate a previous desired chillers input 726 representing the set of desired chillers from a previous time step. Similarly, equipment staging coordinator 344 may apply a delay element 741 to desired HRCs input 703 to generate a previous desired HRCs input 725 representing the set of desired HRCs from a previous time step.

Equipment staging coordinator 344 is shown receiving an interim chillers input 705 and an interim HRCs input 704 from BAS 308. As previously described, interim chillers input 705 and interim HRCs input 704 may indicate the set of chillers and HRCs, respectively, that are currently being commanded by BAS 308 and/or subplants 204-206 with the goal of moving toward the set of desired chillers and HRCs. Equipment staging coordinator 344 may apply a delay element 742 to interim chillers input 705 to generate a previous interim chillers input 723 representing the set of interim chillers from a previous time step. Similarly, equipment staging coordinator 344 may apply a delay element 743 to interim HRCs input 704 to generate a previous interim HRCs input 724 representing the set of interim HRCs from a previous time step.

Equipment staging coordinator 344 is shown receiving a chillers capacity input and a HRCs capacity input from BAS 308. The capacity inputs may indicate the current status of the chillers 232 in chiller subplant 206 and the HRCs 226 in HRC subplant 204. For example, the capacity inputs may indicate which of chillers 232 and HRCs 226 are currently active or inactive, a quantity of chillers 232 and HRCs 226 that are currently active or inactive, individual capacities for each of chillers 232 and HRCs 226, and/or the total cooling capacities of chiller subplant 206 and HRC subplant 204.

Equipment staging coordinator 344 may apply a delay element 744 to the chillers capacity input to generate a previous chillers capacity input representing the chillers capacity from a previous time step. The chillers capacity input may be compared with the previous chillers capacity input at comparator blocks 745 and 746. Comparator block 745 may determine whether the current chillers capacity is greater than the previous chillers capacity (i.e., whether the chillers capacity has just increased). Comparator block 745 may output a binary variable 709 (e.g., true/false, yes/no, etc.) indicating whether the chillers capacity has increased. For example, variable 709 may be true if the current chillers capacity is greater than the previous chillers capacity and false if the current chillers capacity is not greater than the previous chillers capacity. Similarly, comparator block 746 may determine whether the current chillers capacity is less than the previous chillers capacity (i.e., whether the chillers capacity has just decreased). Comparator block 746 may output a binary variable 711 indicating whether the chillers capacity has decreased. For example, variable 711 may be true if the current chillers capacity is less than the previous chillers capacity and false if the current chillers capacity is not less than the previous chillers capacity.

Equipment staging coordinator 344 may apply a delay element 748 to the HRCs capacity input to generate a previous HRCs capacity input representing the HRCs capacity from a previous time step. The HRCs capacity input may be compared with the previous HRCs capacity input at comparator blocks 749 and 750. Comparator block 749 may determine whether the current HRCs capacity is greater than the previous HRCs capacity (i.e., whether the HRCs capacity has just increased). Comparator block 749 may output a binary variable 717 indicating whether the HRCs capacity has increased. For example, variable 717 may be true if the current HRCs capacity is greater than the previous HRCs capacity and false if the current HRCs capacity is not greater than the previous HRCs capacity. Similarly, comparator block 750 may determine whether the current HRCs capacity is less than the previous HRCs capacity (i.e., whether the HRCs capacity has just decreased). Comparator block 750 may output a binary variable 718 indicating whether the HRCs capacity has decreased. For example, variable 718 may be true if the current HRCs capacity is less than the previous HRCs capacity and false if the current HRCs capacity is not less than the previous HRCs capacity.

Equipment staging coordinator 344 is shown receiving an input 707 from toggle input 602 and a zero input 727. As previously described, toggle input 602 may provide an input 707 that toggles between binary values (e.g., true/false, yes/no, etc.) on a periodic basis (e.g., every 30 seconds, every 15 minutes, etc.) or in response to a control signal from an external system or device. Equipment staging coordinator 344 may apply a "not" element 751 to input 707 to generate binary input 712. Input 712 may be the opposite of input 707. For example, if input 707 is true, input 712 may be false. If input 707 is false, input 707 may be true. Each of inputs 707 and 712 may be used to determine whether to allow or prevent staging of a particular subplant. Advantageously, because only one of inputs 707 and 712 can have the same binary value at the same time, only one of chiller subplant 206 and HRC subplant 204 may be allowed to stage its equipment at any given time. Zero input 727 may be used as part of a comparison to determine whether various other inputs are greater than or equal to zero.

Figure 7B:
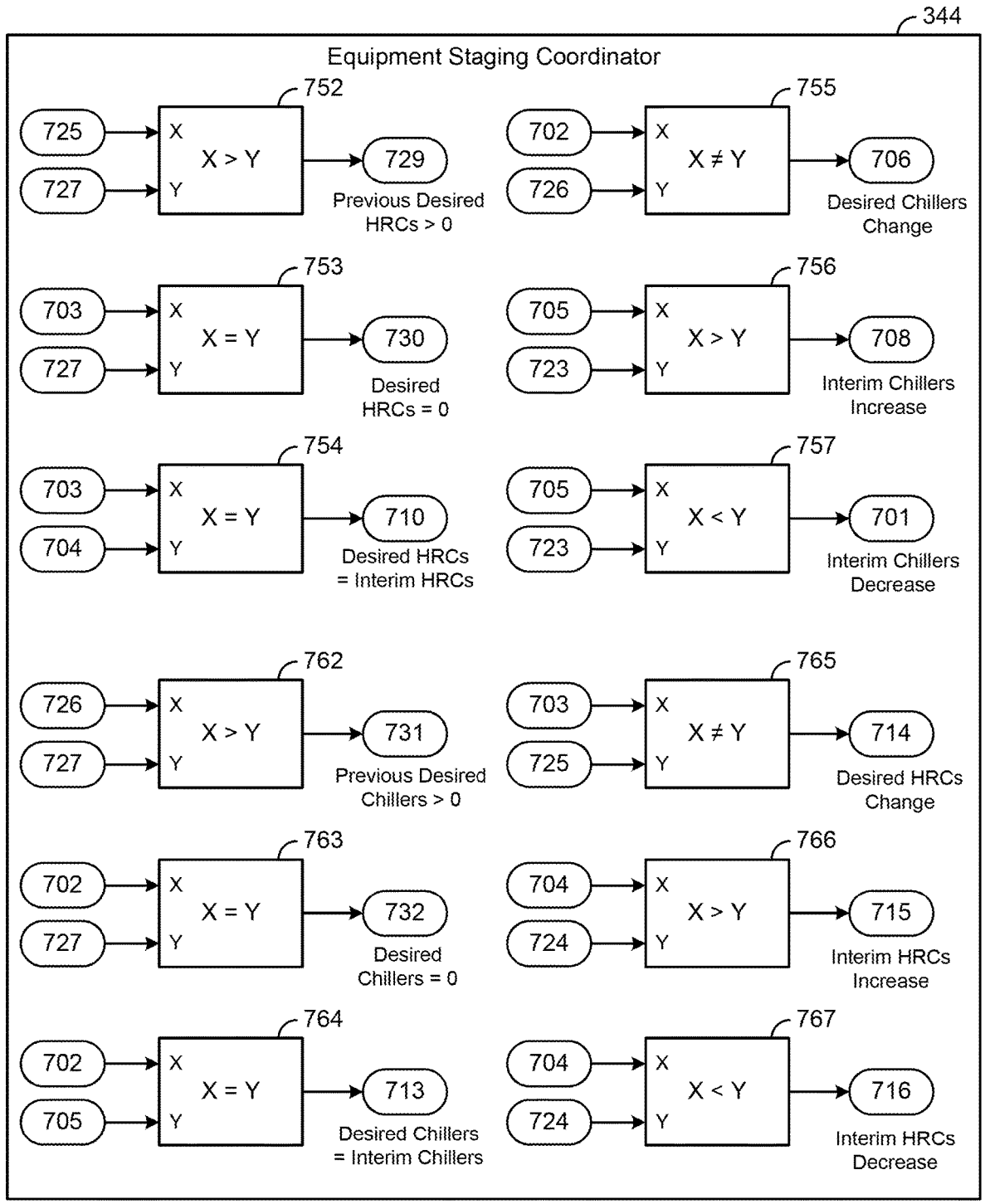
FIG. 7B is a block diagram illustrating a set of comparator blocks which may be used by the equipment staging coordinator of FIG. 4, according to an exemplary embodiment.

Referring now to FIG. 7B, a set of comparator blocks 752-767 which may be used by equipment staging coordinator 344 are shown, according to an exemplary embodiment. Equipment staging coordinator 344 may use comparator blocks 752-767 to compare various input variables and to determine whether the input variables satisfy predetermined criteria incorporated into each comparator block (e.g., whether a variable is greater than another variable, equal to another variable, less than another variable, etc.). Comparator blocks 752-767 may output binary values (e.g., true/false, etc.) indicating whether the compared variables satisfy the criteria or relationship defined by each block. For example, if the relationship between the input variables defined by a comparator block is true (e.g., variable X>variable Y), the comparator block may output a binary "true" value. However, if the relationship between the input variables defined by a comparator block is not true, the comparator block may output a binary "false" value.

Comparator block 752 may compare previous desired HRCs input 725 with zero input 727 to determine whether previous desired HRCs input 725 is greater than zero. If previous desired HRCs input 725 is greater than zero, comparator block 752 may set variable 729 to true. However, if previous desired HRCs input 725 is not greater than zero, comparator block 752 may set variable 729 to false.

Comparator block 753 may compare current desired HRCs input 703 with zero input 727 to determine whether current desired HRCs input 703 is equal to zero. If current desired HRCs input 703 is equal to zero, comparator block 753 may set variable 730 to true. However, if current desired HRCs input 703 is not equal to zero, comparator block 753 may set variable 730 to false.

Comparator block 754 may compare desired HRCs input 703 with interim HRCs input 704 to determine whether desired HRCs input 703 is equal to interim HRCs input 704. If desired HRCs input 703 is equal to interim HRCs input 704, comparator block 754 may set variable 710 to true, indicating that HRC subplant 204 is at steady state. However, if current desired HRCs input 703 is not equal to interim HRCs input 704, comparator block 754 may set variable 710 to false, indicating that HRC subplant 204 is not at steady state.

Comparator block 755 may compare desired chillers input 702 with previous desired chillers input 726 to determine whether desired chillers input 702 is not equal to previous desired chillers input 726. If desired chillers input 702 is not equal to previous desired chillers input 726, comparator block 755 may set variable 706 to true, indicating that chiller subplant 206 is not at steady state. However, if desired chillers input 702 is equal to previous desired chillers input 726, comparator block 755 may set variable 706 to false, indicating that chiller subplant 206 is at steady state.

Comparator block 756 may compare current interim chillers input 705 with previous interim chillers input 723 to determine whether current interim chillers input 705 is greater than previous interim chillers input 723. If current interim chillers input 705 is greater than previous interim chillers input 723, comparator block 756 may set variable 708 to true, indicating that the set of interim chillers has just increased. However, current interim chillers input 705 is not greater than previous interim chillers input 723, comparator block 756 may set variable 708 to false, indicating that the set of interim chillers has not increased.

Comparator block 757 may compare current interim chillers input 705 with previous interim chillers input 723 to determine whether current interim chillers input 705 is less than previous interim chillers input 723. If current interim chillers input 705 is less than previous interim chillers input 723, comparator block 757 may set variable 701 to true, indicating that the set of interim chillers has just decreased. However, current interim chillers input 705 is not less than previous interim chillers input 723, comparator block 757 may set variable 701 to false, indicating that the set of interim chillers has not decreased.

Comparator block 762 may compare previous desired chillers input 726 with zero input 727 to determine whether previous desired chillers input 726 is greater than zero. If previous desired chillers input 726 is greater than zero, comparator block 762 may set variable 731 to true. However, if previous desired chillers input 726 is not greater than zero, comparator block 762 may set variable 731 to false.

Comparator block 763 may compare current desired chillers input 702 with zero input 727 to determine whether current desired chillers input 702 is equal to zero. If current desired chillers input 702 is equal to zero, comparator block 763 may set variable 732 to true. However, if current desired chillers input 702 is not equal to zero, comparator block 763 may set variable 732 to false.

Comparator block 764 may compare desired chillers input 713 with interim chillers input 705 to determine whether desired chillers input 702 is equal to interim chillers input 705. If desired chillers input 702 is equal to interim chillers input 705, comparator block 764 may set variable 713 to true, indicating that chiller subplant 206 is at steady state. However, if current desired chillers input 702 is not equal to interim chillers input 705, comparator block 764 may set variable 713 to false, indicating that chiller subplant 206 is not at steady state.

Comparator block 765 may compare desired HRCs input 703 with previous desired HRCs input 725 to determine whether desired HRCs input 703 is not equal to previous desired HRCs input 725. If desired HRCs input 703 is not equal to previous desired HRCs input 725, comparator block 765 may set variable 714 to true, indicating that HRC subplant 204 is not at steady state. However, if desired HRCs input 703 is equal to previous desired HRCs input 725, comparator block 765 may set variable 714 to false, indicating that HRC subplant 204 is at steady state.

Comparator block 766 may compare current interim HRCs input 704 with previous interim HRCs input 724 to determine whether current interim HRCs input 704 is greater than previous interim HRCs input 724. If current interim HRCs input 704 is greater than previous interim HRCs input 724, comparator block 766 may set variable 715 to true, indicating that the set of interim HRCs has just increased. However, current interim HRCs input 704 is not greater than previous interim HRCs input 724, comparator block 766 may set variable 715 to false, indicating that the set of interim HRCs has not increased.

Comparator block 767 may compare current interim HRCs input 704 with previous interim HRCs input 724 to determine whether current interim HRCs input 704 is less than previous interim HRCs input 724. If current interim HRCs input 704 is less than previous interim HRCs input 724, comparator block 767 may set variable 716 to true, indicating that the set of interim HRCs has just decreased. However, current interim HRCs input 704 is not less than previous interim HRCs input 724, comparator block 767 may set variable 716 to false, indicating that the set of interim HRCs has not decreased.

Figure 7C:
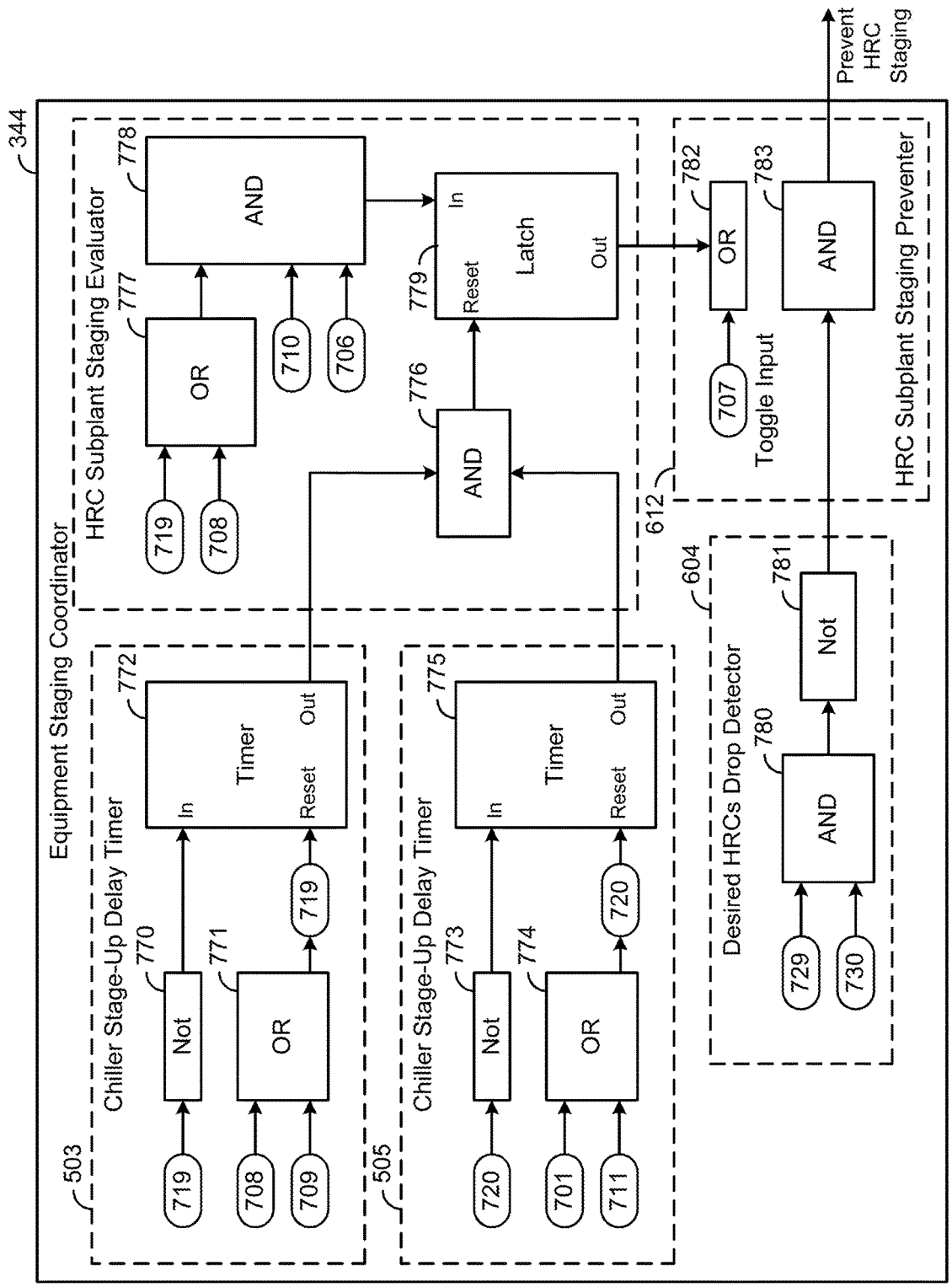
FIG. 7C is a block diagram of logic components which may be used by the equipment staging coordinator of FIG. 4 to determine whether to prevent or allow HRC equipment staging, according to an exemplary embodiment.

Referring now to FIG. 7C, a block diagram of logic components which may be used by equipment staging coordinator 344 to determine whether to prevent or allow HRC equipment staging is shown, according to an exemplary embodiment. Equipment staging coordinator 344 is shown to include a chiller stage-up delay timer 503 and a chiller stage-down delay timer 505. In some embodiments, timers 503 and 505 are components of chiller staging detector 502 and chiller staging timer 504.

Chiller stage-up delay timer 503 may be configured to determine whether a chiller stage-up has recently occurred or is in progress. In some embodiments, a chiller stage-up includes at least one of an increase in the interim chillers or an increase in chiller capacity. Chiller stage-up delay timer 503 is shown to include an "OR" block 771 that receives variable 708 indicating whether the interim chillers have increased and variable 709 indicating whether the chillers capacity has increased. If either of variables 708 or 709 are true, OR block 771 may set variable 719 to true. However, if both of variables 708 or 709 are false, OR block 771 may set variable 719 to false.

Chiller stage-up delay timer 503 is shown to include a timer 772. Timer 772 may be configured to output a binary value indicating whether timer 772 has expired. In some embodiments, timer 772 outputs a binary value of "false" while timer 772 has not yet expired, and a binary value of "true" once timer 772 has expired. Timer 772 may be a countdown timer that resets to a predetermined value when variable 719 is true. Since variable 719 represents a chiller stage-up, timer 772 may reset each time a chiller stage-up occurs. Timer 772 may expire if the value of variable 719 remains false (i.e., a chiller stage-up does not occur) for the duration of timer 772. Once timer 772 expires, timer 772 may relay the value of the variable received at its input port, which is shown as the opposite of variable 719 (i.e., variable 719 passed through NOT element 770). Variable 719 may be set to false when a chiller stage-up has not occurred for the duration of timer 772, which causes timer 772 to relay a value of "true" (i.e., the opposite of variable 719) to AND block 776 upon expiration of timer 772. Timer 772 may continue to output a binary value of true to AND block 776 until a chiller stage-up is once again detected, at which time timer 772 may switch to outputting a binary value of false.

Chiller stage-down delay timer 505 may be configured to determine whether a chiller stage-down has recently occurred or is in progress. In some embodiments, a chiller stage-down includes at least one of a decrease in the interim chillers or a decrease in chiller capacity. Chiller stage-down delay timer 505 is shown to include an "OR" block 774 that receives variable 701 indicating whether the interim chillers have decreased and variable 711 indicating whether the chillers capacity has decreased. If either of variables 701 or 711 are true, OR block 774 may set variable 720 to true. However, if both of variables 701 or 711 are false, OR block 774 may set variable 720 to false.

Chiller stage-down delay timer 505 is shown to include a timer 775. Timer 775 may be configured to output a binary value indicating whether timer 775 has expired. In some embodiments, timer 775 outputs a binary value of "false" while timer 775 has not yet expired, and a binary value of "true" once timer 775 has expired. Timer 775 may be a countdown timer that resets to a predetermined value when variable 720 is true. Since variable 720 represents a chiller stage-down, timer 775 may reset each time a chiller stage-down occurs. Timer 775 may expire if the value of variable 720 remains false (i.e., a chiller stage-down does not occur) for the duration of timer 775. Once timer 775 expires, timer 775 may relay the value of the variable received at its input port, which is shown as the opposite of variable 720 (i.e., variable 720 passed through NOT element 773). Variable 720 may be set to false when a chiller stage-down has not occurred for the duration of timer 775, which causes timer 775 to relay a value of "true" (i.e., the opposite of variable 720) to AND block 776 upon expiration of timer 775. Timer 775 may continue to output a binary value of true to AND block 776 until a chiller stage-down is once again detected, at which time timer 775 may switch to outputting a binary value of false.

Still referring to FIG. 7C, equipment staging coordinator 344 is shown to include HRC subplant staging evaluator 606. HRC subplant staging evaluator 606 is shown to include an AND block 776 that receives the outputs from timers 772 and 775. AND block 776 may output a binary value of "true" if both of the outputs from timers 772 and 775 are true and a binary value of "false" if either of the outputs from timers 772 and 775 are false. In some embodiments, AND block 776 outputs a value of true when both timers 772 and 775 are expired, indicating that neither a chiller stage-up nor a chiller stage-down has recently occurred. However, AND block 776 may output a value of false when one or both of timers 772 and 775 are not yet expired, indicating that a chiller stage-up and/or a chiller stage-down has decently occurred.

HRC subplant staging evaluator 606 is shown to include a latch 779. Latch 779 may be configured to provide a fixed output (e.g., a binary value of "true") until latch 779 is reset. In some embodiments, latch 779 is reset in response to receiving a binary value of "true" at its reset port (i.e., from AND block 776), which may occur when both chiller stage-up delay timer 503 and chiller stage-down delay timer 505 have expired. Once latch 779 is reset, latch 779 may relay the value of the variable received at its input port. The input port of latch 779 is shown receiving an input from AND block 778.

AND block 778 may provide latch 779 with a binary value of "true" if all of the inputs to AND block 778 are true. Conversely, AND block 778 may provide latch 779 with a binary value of "false" if one or more of the inputs to AND block 778 is false. AND block 778 is shown receiving inputs of variable 710 indicating whether the desired HRCs equal the interim HRCs (i.e., whether HRC subplant 204 is at steady state), variable 706 indicating whether the desired chillers is not equal to the previous desired chillers (i.e., chiller subplant 206 is not at steady state), and an input from OR block 777 indicating whether a chiller stage-up or a chiller stage-down has recently occurred. Once reset, latch 779 may provide an output of false until all of the inputs to AND block 778 are true. When all of the inputs to AND block 778 become true, latch 779 may switch to providing an output of true, which may be maintained until latch 779 is reset.

Still referring to FIG. 7C, equipment staging coordinator 344 is shown to include a desired HRCs drop detector 604 and a HRC subplant staging preventer 612. Desired HRCs drop detector 604 is shown to include an AND block 780 that receives variable 729 indicating whether the previous desired HRCs is greater than zero and variable 730 indicating whether the current desired HRCs is equal to zero. If both variables 729 and 730 are true, desired HRCs drop detector 604 may conclude that the desired HRCs has recently dropped to zero from a previous non-zero value. AND block 780 may output a binary value of "true" when both variables 729-730 are true, and a binary value of "false" when either of variables 729-730 is false. The output of AND block 780 may be passed through "not" block 781, which outputs the opposite of the output from AND block 780. This causes the output from desired HRCs drop detector 604 to be false when a HRC drop to zero is detected, and true when a HRC drop to zero is not detected.

HRC subplant staging preventer 612 is shown to include an OR block 782 that receives the output from latch 779 and toggle input 707. If either of the inputs to OR block 782 are true, OR block 782 may output a value of true. In other words, OR block 782 may output a value of true when toggle input 707 is true and/or HRC subplant staging evaluator 606 outputs a value of true, indicating that it is desired to prevent HRC equipment staging. The output from OR block 782 and the output from desired HRCs drop detector 604 may be provided to an AND block 783, which outputs a signal to prevent HRC staging if both of the inputs to AND block 783 are true.

The overall function of the logic components shown in FIG. 7C causes HRC subplant staging preventer 612 to allow HRC equipment staging in response to receiving a binary "false" value from desired HRCs drop detector 604 (indicating that the desired HRCs has dropped to zero), regardless of the inputs from HRC subplant staging evaluator 606 and toggle input 707. However, if desired HRCs drop detector 604 provides a binary output of "true," HRC subplant staging preventer 612 may prevent HRC equipment staging in response to toggle input 707 providing a binary input of true and/or HRC subplant staging evaluator 606 providing a binary input of true. HRC subplant staging evaluator 606 may provide a binary output of true when a chiller stage-up or stage-down has recently occurred, and a binary output of false when a chiller stage-up or stage-down has not recently occurred. Therefore, HRC subplant staging preventer 612 may prevent HRC equipment staging when the toggle input 707 is true and/or chiller subplant staging has recently occurred, provided that the desired HRCs have not dropped to zero.

Figure 7D:
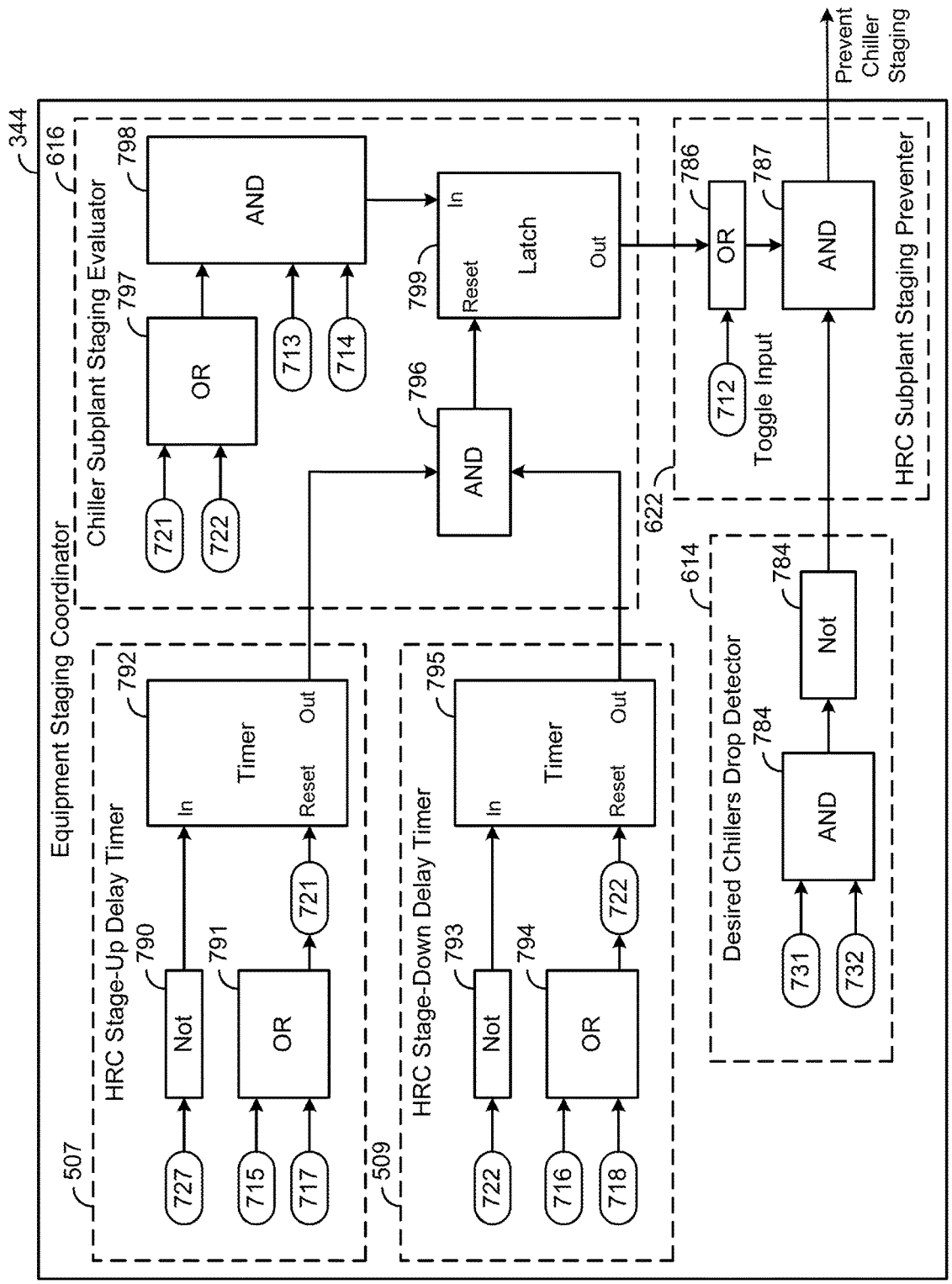
FIG. 7D is a block diagram of logic components which may be used by the equipment staging coordinator of FIG. 4 to determine whether to prevent or allow chiller equipment staging, according to an exemplary embodiment.

Referring now to FIG. 7D, a block diagram of logic components which may be used by equipment staging coordinator 344 to determine whether to prevent or allow chiller equipment staging is shown, according to an exemplary embodiment. Equipment staging coordinator 344 is shown to include a HRC stage-up delay timer 507 and a HRC stage-down delay timer 509. In some embodiments, timers 507 and 509 are components of HRC staging detector 508 and HRC staging timer 510.

HRC stage-up delay timer 507 may be configured to determine whether a HRC stage-up has recently occurred or is in progress. In some embodiments, a HRC stage-up includes at least one of an increase in the interim HRCs or an increase in HRC capacity. HRC stage-up delay timer 507 is shown to include an "OR" block 791 that receives variable 715 indicating whether the interim HRCs have increased and variable 717 indicating whether the HRCs capacity has increased. If either of variables 715 or 717 are true, OR block 791 may set variable 721 to true. However, if both of variables 715 or 717 are false, OR block 791 may set variable 721 to false.

HRC stage-up delay timer 507 is shown to include a timer 792. Timer 792 may be configured to output a binary value indicating whether timer 792 has expired. In some embodiments, timer 792 outputs a binary value of "false" while timer 792 has not yet expired, and a binary value of "true" once timer 792 has expired. Timer 792 may be a countdown timer that resets to a predetermined value when variable 721 is true. Since variable 721 represents a HRC stage-up, timer 792 may reset each time a HRC stage-up occurs. Timer 792 may expire if the value of variable 721 remains false (i.e., a HRC stage-up does not occur) for the duration of timer 792. Once timer 792 expires, timer 792 may relay the value of the variable received at its input port, which is shown as the opposite of variable 721 (i.e., variable 721 passed through NOT element 790). Variable 721 may be set to false when a HRC stage-up has not occurred for the duration of timer 792, which causes timer 792 to relay a value of "true" (i.e., the opposite of variable 721) to AND block 796 upon expiration of timer 792. Timer 792 may continue to output a binary value of true to AND block 796 until a HRC stage-up is once again detected, at which time timer 792 may switch to outputting a binary value of false.

HRC stage-down delay timer 509 may be configured to determine whether a HRC stage-down has recently occurred or is in progress. In some embodiments, a HRC stage-down includes at least one of a decrease in the interim HRCs or a decrease in HRC capacity. HRC stage-down delay timer 509 is shown to include an "OR" block 794 that receives variable 716 indicating whether the interim HRCs have decreased and variable 718 indicating whether the HRCs capacity has decreased. If either of variables 716 or 718 are true, OR block 794 may set variable 722 to true. However, if both of variables 716 or 718 are false, OR block 794 may set variable 722 to false.

HRC stage-down delay timer 509 is shown to include a timer 795. Timer 795 may be configured to output a binary value indicating whether timer 795 has expired. In some embodiments, timer 795 outputs a binary value of "false" while timer 795 has not yet expired, and a binary value of "true" once timer 795 has expired. Timer 795 may be a countdown timer that resets to a predetermined value when variable 722 is true. Since variable 722 represents a HRC stage-down, timer 795 may reset each time a HRC stage-down occurs. Timer 795 may expire if the value of variable 722 remains false (i.e., a HRC stage-down does not occur) for the duration of timer 795. Once timer 795 expires, timer 795 may relay the value of the variable received at its input port, which is shown as the opposite of variable 722 (i.e., variable 722 passed through NOT element 793). Variable 722 may be set to false when a HRC stage-down has not occurred for the duration of timer 795, which causes timer 795 to relay a value of "true" (i.e., the opposite of variable 722) to AND block 796 upon expiration of timer 795. Timer 795 may continue to output a binary value of true to AND block 796 until a HRC stage-down is once again detected, at which time timer 795 may switch to outputting a binary value of false.

Still referring to FIG. 7D, equipment staging coordinator 344 is shown to include chiller subplant staging evaluator 616. Chiller subplant staging evaluator 616 is shown to include an AND block 796 that receives the outputs from timers 792 and 795. AND block 796 may output a binary value of "true" if both of the outputs from timers 792 and 795 are true and a binary value of "false" if either of the outputs from timers 792 and 795 are false. In some embodiments, AND block 796 outputs a value of true when both timers 792 and 795 are expired, indicating that neither a HRC stage-up nor a HRC stage-down has recently occurred. However, AND block 796 may output a value of false when one or both of timers 792 and 795 are not yet expired, indicating that a HRC stage-up and/or a HRC stage-down has decently occurred.

Chiller subplant staging evaluator 616 is shown to include a latch 799. Latch 799 may be configured to provide a fixed output (e.g., a binary value of "true") until latch 799 is reset. In some embodiments, latch 799 is reset in response to receiving a binary value of "true" at its reset port (i.e., from AND block 796), which may occur when both HRC stage-up delay timer 507 and HRC stage-down delay timer 509 have expired. Once latch 799 is reset, latch 799 may relay the value of the variable received at its input port. The input port of latch 799 is shown receiving an input from AND block 798.

AND block 798 may provide latch 799 with a binary value of "true" if all of the inputs to AND block 798 are true. Conversely, AND block 798 may provide latch 799 with a binary value of "false" if one or more of the inputs to AND block 798 is false. AND block 798 is shown receiving inputs of variable 713 indicating whether the desired chillers equal the interim chillers (i.e., whether chiller subplant 206 is at steady state), variable 714 indicating whether the desired HRCs is not equal to the previous desired HRCs (i.e., HRC subplant 204 is not at steady state), and an input from OR block 797 indicating whether a HRC stage-up or a HRC stage-down has recently occurred. Once reset, latch 799 may provide an output of false until all of the inputs to AND block 798 are true. When all of the inputs to AND block 798 become true, latch 799 may switch to providing an output of true, which may be maintained until latch 799 is reset.

Still referring to FIG. 7D, equipment staging coordinator 344 is shown to include a desired chillers drop detector 614 and a HRC subplant staging preventer 612. Desired chillers drop detector 614 is shown to include an AND block 784 that receives variable 731 indicating whether the previous desired chillers is greater than zero and variable 732 indicating whether the current desired chillers is equal to zero. If both variables 731 and 732 are true, desired chillers drop detector 614 may conclude that the desired chillers has recently dropped to zero from a previous non-zero value. AND block 784 may output a binary value of "true" when both variables 731-732 are true, and a binary value of "false" when either of variables 731-732 is false. The output of AND block 784 may be passed through "not" block 785, which outputs the opposite of the output from AND block 784. This causes the output from desired chillers drop detector 614 to be false when a chiller drop to zero is detected, and true when a chiller drop to zero is not detected.

Chiller subplant staging preventer 622 is shown to include an OR block 786 that receives the output from latch 799 and toggle input 712. If either of the inputs to OR block 786 are true, OR block 786 may output a value of true. In other words, OR block 786 may output a value of true when toggle input 712 is true and/or chiller subplant staging evaluator 616 outputs a value of true, indicating that it is desired to prevent chiller equipment staging. The output from OR block 786 and the output from desired chillers drop detector 614 may be provided to an AND block 787, which outputs a signal to prevent chiller staging if both of the inputs to AND block 787 are true.

The overall function of the logic components shown in FIG. 7D causes chiller subplant staging preventer 622 to allow chiller equipment staging in response to receiving a binary "false" value from desired chillers drop detector 614 (indicating that the desired chillers has dropped to zero), regardless of the inputs from chiller subplant staging evaluator 616 and toggle input 712. However, if desired chillers drop detector 614 provides a binary output of "true," chiller subplant staging preventer 622 may prevent chiller equipment staging in response to toggle input 712 providing a binary input of true and/or chiller subplant staging evaluator 616 providing a binary input of true. Chiller subplant staging evaluator 616 may provide a binary output of true when a HRC stage-up or stage-down has recently occurred, and a binary output of false when a HRC stage-up or stage-down has not recently occurred. Therefore, chiller subplant staging preventer 622 may prevent chiller equipment staging when the toggle input 712 is true and/or HRC subplant staging has recently occurred, provided that the desired chillers have not dropped to zero.

Coordinated HVAC Equipment Staging Process

Figure 8:
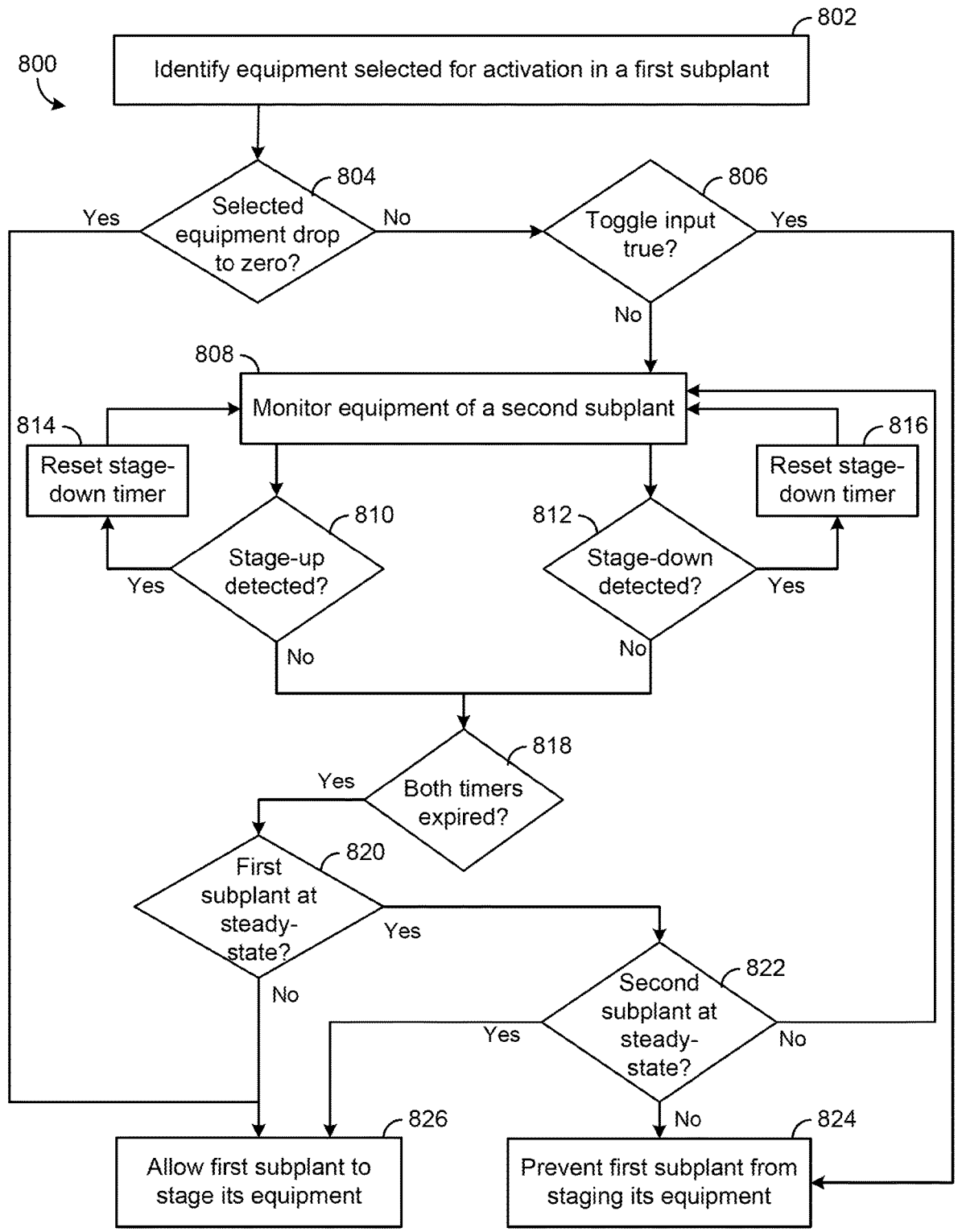
FIG. 8 is a flowchart of a process for coordinating HVAC equipment staging across multiple subplants, according to an exemplary embodiment.

Referring now to FIG. 8, a flowchart of a process 800 for coordinating HVAC equipment staging across multiple subplants is shown, according to an exemplary embodiment. In some embodiments, process 800 is performed by equipment staging coordinator 344, as described with reference to FIGS. 5-7D.

Process 800 is shown to include identifying equipment selected for activation in a first subplant (step 802). The first subplant may be chiller subplant 206, HRC subplant 204, or any other subplant of central plant 200. In some embodiments, the first subplant includes a collection of HVAC equipment configured to serve a particular type of load (e.g., heating, cooling, ventilation, etc.). Identifying equipment selected for activation in the first subplant may include identifying a set of the subplant equipment that is desired to be used to meet the subplant load. In some embodiments, the equipment selected for activation may be selected by a subplant optimizer (e.g., low level optimizer 332) configured to automatically determine an optimal set of subplant equipment to meet a load setpoint for the first subplant. For example, the equipment identified in step 802 may include the set of desired chillers (if the first subplant is a chiller subplant) or a set of HRCs (if the first subplant is a HRC subplant).

Process 800 is shown to include determining whether the selected equipment has dropped to zero (step 804). In some embodiments, step 804 is performed by desired HRCs drop detector 604 and/or desired chillers drop detector 614, as previously described. For example, step 804 may include determining whether the selected set of equipment is an empty set or if the load setpoint for the subplant has dropped to zero. In response to a determination that the selected equipment has dropped to zero (i.e., the result of step 804 is "yes"), process 800 may proceed to allowing the first subplant to stage its equipment (step 826) and process 800 may end. However, in response to a determination that the selected equipment has not dropped to zero (i.e., the result of step 804 is "no"), process 800 may proceed to step 806.

Process 800 is shown to include determining whether the toggle input is true (step 806). Step 806 may be performed in response to a determination in step 804 that the selected equipment has not dropped to zero. The toggle input may be configured to toggle between binary values (e.g., true/false, on/off, 1/0, etc.) and may provide opposite inputs to different instances of process 800. For example, if the toggle input provides an input of "true" to an instance of process 800 that determines whether to allow or prevent chiller equipment staging, the toggle input may provide an input of "false" to a parallel instance of process 800 that determines whether to allow or prevent HRC equipment staging.

In some embodiments, the toggle input toggles between binary inputs on a periodic basis (e.g., every 30 seconds, every 15 minutes, etc.). In other embodiments, the toggle input toggles between binary inputs in response to an input from BAS 308, subplants 202-212, or central plant controller 302. Advantageously, the toggle input may ensure that at least one of the subplants configured to meet a particular load is always at steady state by preventing both subplants from staging their equipment simultaneously. If the toggle input is true (i.e., the result of step 806 is "yes"), process 800 may proceed to preventing the first subplant from staging its equipment (step 824) and process 800 may end. However, if the toggle input false true (i.e., the result of step 806 is "no"), process 800 may proceed to step 808.

Still referring to FIG. 8, process 800 is shown to include monitoring the equipment of a second subplant (step 808). In some embodiments, the second subplant is another subplant configured to meet the same type of load as the first subplant. For example, if the first subplant is a chiller subplant, the second subplant may be a HRC subplant or another chiller subplant. In various embodiments, the first and second subplants may be located within the same building or facility or distributed across multiple buildings or facilities.

Step 808 may include monitoring the equipment of the second subplant for staging events. Staging events may include stage-up events or stage-down events for the equipment of the second subplant. Stage-up events may include, for example, increasing the capacity of the equipment of the second subplant, activating equipment of the second subplant, turning on equipment of the second subplant, and/or increasing a load setpoint for the second subplant. In some embodiments, stage-up events include an increase in the number of devices of the second subplant currently being commanded (i.e., the interim devices of the second subplant) and/or the capacity of the second subplant. Similarly, stage-down events may include, for example, decreasing the capacity of the equipment of the second subplant, deactivating equipment of the second subplant, turning off equipment of the second subplant, and/or decreasing a load setpoint for the second subplant. In some embodiments, stage-down events include a decrease in the number of devices of the second subplant currently being commanded (i.e., the interim devices of the second subplant) and/or the capacity of the second subplant.

Process 800 is shown to include determining whether a stage-up event is detected (step 810) and determining whether a stage-down event is detected (step 812). Steps 810 and 812 may be performed concurrently with each other while monitoring the equipment of the second subplant. If a stage up event is detected (i.e., the result of step 810 is "yes"), process 800 may reset a stage-up timer (step 814) and return to step 808. Similarly, if a stage down event is detected (i.e., the result of step 812 is "yes"), process 800 may reset a stage-down timer (step 816) and return to step 808.

If neither a stage-up event is detected nor a stage down event is detected (i.e., the results of steps 810-812 are "no"), process 800 may proceed to determining whether both timers are expired (step 818). If one or both of the timers are not yet expired (i.e., the result of step 818 is "no"), process 800 may return to step 808. Steps 808-818 may be repeated iteratively until it is determined that both timers have expired (i.e., the result of step 818 is "yes"). Once both timers have expired, process 800 may proceed to step 820.

Still referring to FIG. 8, process 800 is shown to include determining whether the first subplant is at steady state (step 820). In some embodiments, step 820 is performed by HRC subplant steady state detector 610 or chiller subplant steady state detector 620, as described with reference to FIG. 6. Step 820 may include determining whether the set of interim devices for the first subplant and the set of desired devices for the first subplant are equal. If so, step 820 may conclude that the first subplant is at steady state. In some embodiments, step 820 includes determining whether the set of desired devices for the first subplant has recently changed. If so, step 820 may conclude that the first subplant is not at steady state. If the first subplant is not at steady state (i.e., the result of step 820 is "no"), process 800 may proceed to allowing the first subplant to stage its equipment (step 826) and process 800 may end. However, if the first subplant is at steady state (i.e., the result of step 820 is "yes"), process 800 may proceed to step 822.

Process 800 is shown to include determining whether the second subplant is at steady state (step 822). Step 822 may be performed in response to a determination in step 820 that the first subplant is at steady state. In some embodiments, step 822 includes determining whether the set of desired devices for the second subplant has recently changed. If so, step 822 may conclude that the second subplant is not at steady state. In other embodiments, step 822 may include determining whether the set of interim devices for the second subplant and the set of desired devices for the second subplant are equal. If so, step 822 may conclude that the second subplant is at steady state. If the second subplant is not at steady state (i.e., the result of step 822 is "no"), process 800 may proceed to preventing the first subplant from staging its equipment (step 824). However, if the second subplant is at steady state (i.e., the result of step 822 is "yes"), process 800 may proceed to allowing the first subplant to stage its equipment (step 826) and process 800 may end.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for equipment that includes at least a first group of equipment and a second group of equipment that contribute to a peak energy consumption of a building, the controller comprising:
    a communications interface configured to communicate with the first group of equipment and the second group of equipment; and
    a processing circuit communicably coupled to the communications interface and comprising a processor and memory, the processing circuit configured to:
        detect a staging event for the first group of equipment and to determine when the staging event for the first group of equipment occurs;
        determine a duration of a time period based on an estimated amount of time required for the first group of equipment to reach steady state after the staging event for the first group of equipment occurs;
        determine whether the time period has elapsed since the staging event for the first group of equipment has occurred; and
        prevent the second group of equipment from staging in response to a determination that the time period has not elapsed since the staging event for the first group of equipment has occurred, wherein preventing the second group of equipment from staging reduces the peak energy consumption of the building during the time period and reduces a demand charge based on the peak energy consumption.

2. The controller of claim 1, wherein:
    the first group of equipment comprise equipment of a first subplant of a central plant configured to serve a thermal energy load;
    the second group of equipment comprise equipment of a second subplant of the central plant; and
    the first subplant and the second subplant comprise at least two of a heater subplant, a heat recovery chiller subplant, a chiller subplant, a cooling tower subplant, a hot thermal energy storage subplant, and a cold thermal energy storage subplant.

3. The controller of claim 1, wherein the first group of equipment and the second group of equipment comprise at least one of boilers, heaters, pumps, chillers, heat recovery chillers, cooling towers, and thermal energy storage tanks.

4. The controller of claim 1, wherein the staging event for the first group of equipment comprises at least one of activating or deactivating one or more devices of the first group of equipment, changing a load setpoint for the first group of equipment, and changing a capacity of first group of equipment.

5. The controller of claim 1, further comprising an optimizer configured to perform an optimization process to determine a desired set of equipment of the second group of equipment to operate within the time period.

6. The controller of claim 5, further comprising a desired equipment drop detector configured to determine whether the desired set of equipment of the second group of equipment has dropped to zero;
wherein the processor is configured to allow the second group of equipment to stage in response to a determination that the desired set of equipment of the second group of equipment has dropped to zero.

7. The controller of claim 1, further comprising a toggle input configured to provide opposite binary inputs for the first group of equipment and the second group of equipment;
wherein the processing circuit is configured to allow the second group of equipment to stage in response to a determination that the binary input for the second group of equipment has a first binary value;
wherein the processing circuit is configured to prevent the second group of equipment from staging in response to a determination that the binary input for the second group of equipment has a second binary value, opposite the first binary value.

8. The controller of claim 7, wherein the toggle input is configured to periodically swap the opposite binary inputs for the first group of equipment and the second group of equipment.

9. The controller of claim 7, wherein the processing circuit is configured to use the toggle input as an override signal and determine whether to prevent the second group of equipment from staging based on the toggle input regardless of whether the time period has elapsed since the staging event for the first group of equipment has occurred.

10. The controller of claim 1, wherein:
the processing circuit is configured to determine whether the first group of equipment is at steady state and whether the second group of equipment is at steady state; and
the processing circuit is configured to prevent the second group of equipment from staging in response to a determination that the second group of equipment is at steady state and the first group of equipment is not at steady state.

11. A method for coordinating equipment staging across at least a first group of equipment and a second group of equipment that contribute to a peak energy consumption of a building, the method comprising:
detecting a staging event for the first group of equipment and a time at which the staging event for the first group of equipment occurs;
determining a duration of a time period based on an estimated amount of time required for the first group of equipment to reach steady state after the staging event for the first group of equipment occurs;
determining whether the time period has elapsed since the staging event for the first group of equipment has occurred; and
preventing the second group of equipment from staging in response to a determination that the time period has not elapsed since the staging event for the first group of equipment has occurred, wherein preventing the second group of equipment from staging reduces the peak energy consumption of the building during the time period and reduces a demand charge based on the peak energy consumption.

12. The method of claim 11, wherein:
the first group of equipment comprise equipment of a first subplant of a central plant configured to serve a thermal energy load;
the second group of equipment comprise equipment of a second subplant of the central plant; and
the first subplant and the second subplant comprise at least two of a heater subplant, a heat recovery chiller subplant, a chiller subplant, a cooling tower subplant, a hot thermal energy storage subplant, and a cold thermal energy storage subplant.

13. The method of claim 11, wherein the first group of equipment and the second group of equipment comprise at least one of boilers, heaters, pumps, chillers, heat recovery chillers, cooling towers, and thermal energy storage tanks.

14. The method of claim 11, wherein the staging event for the first group of equipment comprises at least one of activating or deactivating one or more devices of the first group of equipment, changing a load setpoint for the first group of equipment, and changing a capacity of first group of equipment.

15. The method of claim 11, further comprising performing an optimization process to determine a desired set of equipment of the second group of equipment to operate within the time period.

16. The method of claim 15, further comprising:
determining whether the desired set of equipment of the second group of equipment has dropped to zero; and
allowing the second group of equipment to stage in response to a determination that the desired set of equipment of the second group of equipment has dropped to zero.

17. The method of claim 11, further comprising:
providing opposite binary inputs for the first group of equipment and the second group of equipment;
allowing the second group of equipment to stage in response to a determination that the binary input for the second group of equipment has a first binary value;
preventing the second group of equipment from staging in response to a determination that the binary input for the second group of equipment has a second binary value, opposite the first binary value.

18. The method of claim 17, further comprising periodically swapping the opposite binary inputs for the first group of equipment and the second group of equipment.

19. The method of claim 17, wherein a toggle input is used as an override signal to prevent the second group of equipment from staging regardless of whether the time period has elapsed since the staging event for the first group of equipment has occurred.

20. The method of claim 11, further comprising:
determining whether the first group of equipment is at steady state and whether the second group of equipment is at steady state; and
preventing the second group of equipment from staging in response to a determination that the second group of equipment is at steady state and the first group of equipment is not at steady state.

* * * * *